US010784582B2

(12) United States Patent
Kuroiwa et al.

(10) Patent No.: US 10,784,582 B2
(45) Date of Patent: Sep. 22, 2020

(54) WIRELESS TERMINAL MEASUREMENT APPARATUS, CIRCULARLY POLARIZED ANTENNA DEVICE CONNECTABLE THERETO AND WIRELESS TERMINAL MEASUREMENT METHOD

(71) Applicant: ANRITSU CORPORATION, Atsugi-shi (JP)

(72) Inventors: Yoshihiro Kuroiwa, Atsugi (JP); Aya Yamamoto, Atsugi (JP); Tomonori Morita, Atsugi (JP)

(73) Assignee: ANRITSU CORPORATION, Atsugi-shi (JP)

(*) Notice: Subject to any disclaimer, the term of this patent is extended or adjusted under 35 U.S.C. 154(b) by 91 days.

(21) Appl. No.: 16/044,858

(22) Filed: Jul. 25, 2018

(65) Prior Publication Data

US 2019/0221938 A1  Jul. 18, 2019

(30) Foreign Application Priority Data

Aug. 2, 2017 (JP) .................................. 2017-150113

(51) Int. Cl.
*H01Q 1/24* (2006.01)
*H01Q 9/04* (2006.01)
(Continued)

(52) U.S. Cl.
CPC .......... *H01Q 9/0428* (2013.01); *H01Q 1/243* (2013.01); *H01Q 1/36* (2013.01); *H01Q 9/27* (2013.01); *H01Q 21/24* (2013.01); *H04B 17/15* (2015.01)

(58) Field of Classification Search
None
See application file for complete search history.

(56) References Cited

U.S. PATENT DOCUMENTS 6,839,032 B2 * 1/2005 Teshirogi ........... G01R 29/0821
343/702
7,639,183 B2 * 12/2009 Teshirogi ............. H01Q 1/3233
343/700 MS
(Continued)

FOREIGN PATENT DOCUMENTS

CN  1918746 A  2/2007
JP  2001116784 A  4/2001
(Continued)

OTHER PUBLICATIONS

Teshirogi, et al. "Wideband circularly polarized array antenna with sequential rotations and phase shift of elements," Proc. of ISAP'85, 024-3, pp. 117-120, 1985.

*Primary Examiner* — Trinh V Dinh
(74) *Attorney, Agent, or Firm* — Greer Burns & Crain Ltd.

(57) ABSTRACT

A circularly polarized antenna device, which is connectable to a wireless terminal measurement apparatus for performing measurements on a device under test (DUT) provided with an antenna on one surface of the DUT, includes a circularly polarized antenna and a holder. The circularly polarized antenna includes a dielectric substrate and a circularly polarized type of antenna element formed on a first surface of the dielectric substrate. The first surface is opposite to the one surface of the DUT. The circularly polarized antenna is spatially coupled to the antenna of the DUT. The holder holds the circularly polarized antenna and the DUT such that the one surface of the DUT and the dielectric substrate are not parallel to each other.

19 Claims, 29 Drawing Sheets

(51) Int. Cl.
*H01Q 9/27* (2006.01)
*H01Q 21/24* (2006.01)
*H01Q 1/36* (2006.01)
*H04B 17/15* (2015.01)

(56) References Cited

U.S. PATENT DOCUMENTS

| | | | |
|---|---|---|---|
| 10,396,909 B1* | 8/2019 | Cardalda-Garcia | ............................ H04B 17/0085 |
| 10,483,636 B1* | 11/2019 | Koto | ....................... H01Q 1/526 |
| 2008/0231541 A1* | 9/2008 | Teshirogi | ............. H01Q 1/3233 343/895 |
| 2010/0285753 A1* | 11/2010 | Foegelle | ............ H04B 17/3911 455/67.12 |
| 2012/0282863 A1* | 11/2012 | Guo | ......................... H04B 7/04 455/67.12 |
| 2016/0233970 A1* | 8/2016 | Reed | ....................... H04B 17/29 |

FOREIGN PATENT DOCUMENTS

| | | |
|---|---|---|
| JP | 2002171190 A | 6/2002 |
| JP | 2004055612 A | 2/2004 |
| JP | 2016111397 A | 6/2016 |
| WO | 03021824 A1 | 3/2003 |
| WO | 2006051947 A1 | 5/2006 |

* cited by examiner

WIRELESS TERMINAL MEASUREMENT APPARATUS, CIRCULARLY POLARIZED ANTENNA DEVICE CONNECTABLE THERETO AND WIRELESS TERMINAL MEASUREMENT METHOD

CROSS-REFERENCE TO RELATED APPLICATIONS

This application is based upon and claims the benefit of priority from prior Japanese Patent Application No. 2017-150113 filed Aug. 2, 2017, the entire contents of which are incorporated herein by reference.

BACKGROUND OF THE INVENTION

1. Field of the Invention

The present invention relates to wireless terminal measurement apparatuses used with circularly polarized antennas, circularly polarized antenna devices connectable to the wireless terminal measurement apparatuses, and wireless terminal measurement methods.

2. Description of Related Art

In recent years, wireless terminals (smart phones or the like) having antennas attached therein for wireless communication, such as cellular communication and wireless LAN, have been actively produced with the progress of multimedia. In the future, there will be much demand for wireless terminals that transmits and receives broadband wireless signals conforming to IEEE802.11ad, 5G cellular standard or the like, in particular, in a millimeter wave band.

In wireless terminal manufacturing factories, performance tests are carried out to determine whether or not wireless communication antennas provided in the wireless terminals satisfy predetermined criteria. The performance tests are conducted by measuring output levels of radio waves transmitted from the antennas and reception sensitivities of the antennas. The output levels and the reception sensitivities are specified for each communication standard.

When the above performance tests are carried out on each wireless terminal (hereinafter referred to as device under test (DUT)), it is necessary for a user to set the DUTs one by one in an electromagnetic wave shield box, and connect a control terminal and an antenna terminal of each DUT to a measurement apparatus by coaxial cables. Although the performance tests on tens of thousands of DUTs per day can be requested, the time that can be spent for each DUT is limited. Therefore, an efficient measurement that can be conducted in a short time is required.

Speeding up or parallelizing a CPU built in the measurement apparatus can shorten the time required for measurements with the measurement apparatus. However, it is difficult to greatly shorten the time required for connecting the DUT to the measurement apparatus by coaxial cables because the physical connection via the coaxial cables is made by the user.

Further, in the case where an antenna of the DUT radiates a wireless signal or radio signal of K-band or Ka-band (18 GHz to 40 GHz), the configuration that the antenna terminal of the DUT and the measurement apparatus are connected by a coaxial cable causes a large loss during transmission of a signal from the antenna of the DUT to the measurement apparatus through the coaxial cable. Accordingly, there has been a problem that accurate measurements cannot be performed in such cases.

In view of the above circumstances, there has been proposed a measurement apparatus which carries out a performance test on the DUT by transmitting and receiving wireless signals to and from the DUT and which does not require the connection via coaxial cables between the DUT and the measurement apparatus. Such a measurement apparatus is provided with, for example, a circularly polarized antenna for transmitting and receiving the wireless signals to and from the antenna of the DUT (see, for example, Patent Document 1).

Patent Document

Patent Document 1: International Publication No. WO 2006/051947

Non-Patent Document

Non-Patent Document 1: Teshirogi, et al. "Wideband circularly polarized array antenna with sequential rotations and phase shift of elements," Proc. of ISAP'85, 024-3, pp. 117-120, 1985

SUMMARY OF THE INVENTION

Technical Problem

In the case, as disclosed in Patent Document 1, where a circularly polarized antenna is used to transmit and receive wireless signals to and from an antenna of a DUT, a radiation surface of the circularly polarized antenna and a radiation surface of the antenna of the DUT are arranged in parallel. However, when multiple reflections between these two antennas arranged in parallel occur such that signal components in opposite phases cancel each other, the transmission characteristic $S_{21}$ between the two antennas can have a notch (amplitude error) of about several decibels, as compared with an ideal flat characteristic, near the frequency at which the two antennas are used.

In recent years, the operation of wireless terminals such as smart phones has been controlled to suppress the power consumption so as to lengthen the battery duration, by operating internal amplifiers with high efficiency in nonlinear regions thereof. With respect to a DUT that gives to an input signal a distortion due to such nonlinearity of an amplifier, when a performance test is conducted under the condition that there is an amplitude error in the transmission characteristic $S_{21}$ between the circularly polarized antenna and the antenna of the DUT, the measurement accuracies of various characteristics such as modulation accuracy (EVM) and adjacent channel leakage power are greatly deteriorated.

The present invention has been made to solve such conventional problems. It is an object of the present invention to provide: a wireless terminal measurement apparatus, which can perform accurate measurements on a wireless terminal by suppressing an amplitude error caused by multiple reflections occurring between an antenna of the wireless terminal and a circularly polarized antenna connected to the wireless terminal measurement apparatus; a circularly polarized antenna device connectable to the wireless terminal measurement apparatus; and a wireless terminal measurement method.

Solution to Problem

In order to solve the above problems, according to one aspect of the present invention, there is provided a circularly polarized antenna device which is connectable to a wireless terminal measurement apparatus for performing measurements on a device under test (DUT) provided with an antenna on one surface of the DUT, the circularly polarized antenna device comprising: a circularly polarized antenna comprising a dielectric substrate and a circularly polarized type of antenna element formed on a first surface of the dielectric substrate, the first surface being opposite to the one surface of the DUT, the circularly polarized antenna being spatially coupled to the antenna of the DUT; and a holder for holding the circularly polarized antenna and the DUT such that the one surface of the DUT and the dielectric substrate are not parallel to each other.

With this configuration, the circularly polarized antenna device according to the present invention can reduce multiple reflections of a signal to be measured between the antenna of the DUT and the circularly polarized antenna.

Further, in the circularly polarized antenna device according to the present invention, the circularly polarized antenna can suppress the generation of a surface wave, and the circularly polarized antenna having desired radiation characteristics can be obtained.

In the circularly polarized antenna device according to another aspect of the present invention, the circularly polarized antenna comprises a ground conductor which is piled up at a second surface side of the dielectric substrate, the second surface being an opposite surface of the first surface of the dielectric substrate, a plurality of metal posts which are arranged at predetermined intervals so as to form a cavity, the metal posts surrounding the antenna element which is disposed in the cavity, wherein each of the metal posts has one and opposite ends, and penetrates the dielectric substrate along a thickness direction thereof, the one ends of the metal, posts being connected to the ground conductor, and the opposite ends of the metal posts being arranged around the antenna element on the first surface of the dielectric substrate, and a frame-shaped conductor comprising a conducting rim which is disposed at the first surface side of the dielectric substrate and has a predetermined width in a direction of the antenna element, the conducting rim being extended along an arrangement of the opposite ends of the metal posts to define the cavity, and the conducting rim being connected to the opposite ends of the metal posts to short-circuit the metal posts, wherein the cavity and the frame-shaped conductor form a resonator, structural parameters of the resonator and the antenna element having been adjusted to set a resonant frequency of the resonator to a desired value, the structural parameters including at least one of an inside dimension $L_W$ of the given cavity, a rim width $L_R$ of the conducting rim, a number of turns of the antenna element, a basic length a0 of the antenna element, and an element width W of the antenna element, the rim width $L_R$ of the conducting rim being approximately ¼ of a wavelength of a surface wave propagating along the first surface of the dielectric substrate.

In the circularly polarized antenna device according to still another aspect of the present invention, a normal line of a radiation surface of the antenna of the Dur and a normal line of the one surface of the DUT are parallel to each other, and a radiating direction of the antenna of the DUT is equal to a normal direction of the radiation surface of the antenna of the DUT.

With this configuration, the circularly polarized antenna device according to the present invention can reduce multiple reflections of a test signal between the antenna of the DUT and the circularly polarized antenna.

In the circularly polarized antenna device according to yet another aspect of the present invention, a normal line of the first surface of the dielectric substrate of the circularly polarized antenna and a normal line of a radiation surface of the circularly polarized antenna are parallel to each other, and a radiating direction of the circularly polarized antenna is equal to a normal direction of the radiation surface of the circularly polarized antenna.

With this configuration, the circularly polarized antenna device according to the present invention can reduce multiple reflections of a signal to be measured and a test signal between the antenna of the DUT and the circularly polarized antenna.

In the circularly polarized antenna device according to further aspect of the present invention, the antenna element has a predetermined polarization rotation direction, and is formed of a square-shaped spiral type or a circular spiral type having a central side end portion of a spiral, and the circularly polarized antenna further comprises a feed pin whose one end side is connected to the central side end portion of the spiral of the antenna element, the feed pin penetrating the dielectric substrate and the ground conductor.

A wireless terminal measurement apparatus according to one aspect of the present invention comprises: the circularly polarized antenna device according to any one of the above; a signal transmitter for outputting a test signal to the circularly polarized antenna and the DUT; a signal receiver for receiving, through the circularly polarized antenna, a measurement signal output from the DUT in which the test signal was input; and an analyzer for analyzing the received measurement signal.

With this configuration, the wireless terminal measurement apparatus according to the present invention can reduce multiple reflections of a signal to be measured between the antenna of the DUT and the circularly polarized antenna. That is, the wireless terminal measurement apparatus can perform accurate measurements on the DUT by suppressing an amplitude error caused by the multiple reflections occurring between the antenna of the DUT and the circularly polarized antenna.

According to another aspect of the present invention, there is provided is a wireless terminal measurement apparatus for performing measurements on a device under test (DUT) provided with an antenna on one surface of the DUT, the wireless terminal measurement apparatus comprising: a circularly polarized antenna comprising a dielectric substrate and a circularly polarized type of antenna element formed on a first surface of the dielectric substrate, the first surface being opposite to the one surface of the DUT, the circularly polarized antenna being spatially coupled to the antenna of the DUT; a signal transmitter for outputting a test signal to the circularly polarized antenna and the DUT; a signal receiver for receiving, through the circularly polarized antenna, a measurement signal output from the DUT in which the test signal was input; an analyzer for analyzing the received measurement signal; a conveyor for conveying the DUT in a conveying path; a measurement box in which the circularly polarized antenna is disposed, the measurement box having an entrance and an exit for conveyance of the DUT; and a determination unit for determining whether or not the entire DUT has been conveyed to a predetermined area in the measurement box, wherein when the determination unit determines that the entire DUT has been conveyed to the predetermined area, the signal transmitter outputs the test signal to the circularly polarized antenna and the DUT conveyed by the conveyor, wherein when the determination unit determines that the entire DUT has been conveyed to the predetermined area, the signal receiver receives the measurement signal output from the DUT in which the test signal was input, and wherein the circularly polarized antenna is disposed such that the one surface of the DUT provided with the antenna and the dielectric substrate are not parallel to each other.

With this configuration, the wireless terminal measurement apparatus according to the present invention automatically determines that the entire DUT has conveyed to the predetermined area in the measurement box, and then starts a performance test on the DUT, so that performance tests can be performed on various wireless terminals, thereby making it possible to greatly shorten the time required for the tests.

The wireless terminal measurement apparatus according to still another aspect of the present invention further comprises an electromagnetic wave absorber provided above the conveying path, the absorber preventing electromagnetic waves generated by the antenna of the DUT and/or the circularly polarized antenna from leaking out from the entrance and the exit of the measurement box, wherein the measurement box has an electromagnetic wave shielding function.

According to one aspect of the present invention, there is provided a wireless terminal measurement method using the above wireless terminal measurement apparatus comprises a signal transmission step of outputting a test signal to the circularly polarized antenna and the DUT; a signal reception step of receiving, through the circularly polarized antenna, a measurement signal output from the DUT in which the test signal was input; and an analysis step of analyzing the received measurement signal.

With this configuration, the wireless terminal measurement method according to the present invention can reduce multiple reflections of a signal to be measured between the antenna of the DUT and the circularly polarized antenna. That is, the wireless terminal measurement method can perform accurate measurements on the DUT by suppressing an amplitude error caused by the multiple reflections occurring between the antenna of the DUT and the circularly polarized antenna.

Advantageous Effects of Invention

According to the present invention, provided is a wireless terminal measurement apparatus capable of performing accurate measurements on a wireless terminal by suppressing an amplitude error caused by the multiple reflections occurring between an antenna of the wireless terminal and the circularly polarized antenna. Further, a circularly polarized antenna device connectable to the wireless terminal measurement apparatus, and a wireless terminal measurement method are provided.

DESCRIPTION OF THE EMBODIMENTS

Embodiments of a wireless terminal measurement apparatus, a circularly polarized antenna device connectable to the wireless terminal measurement apparatus, and a wireless terminal measurement method according to the present invention will be described hereinafter with reference to the drawings.

First Embodiment

Figure 1:
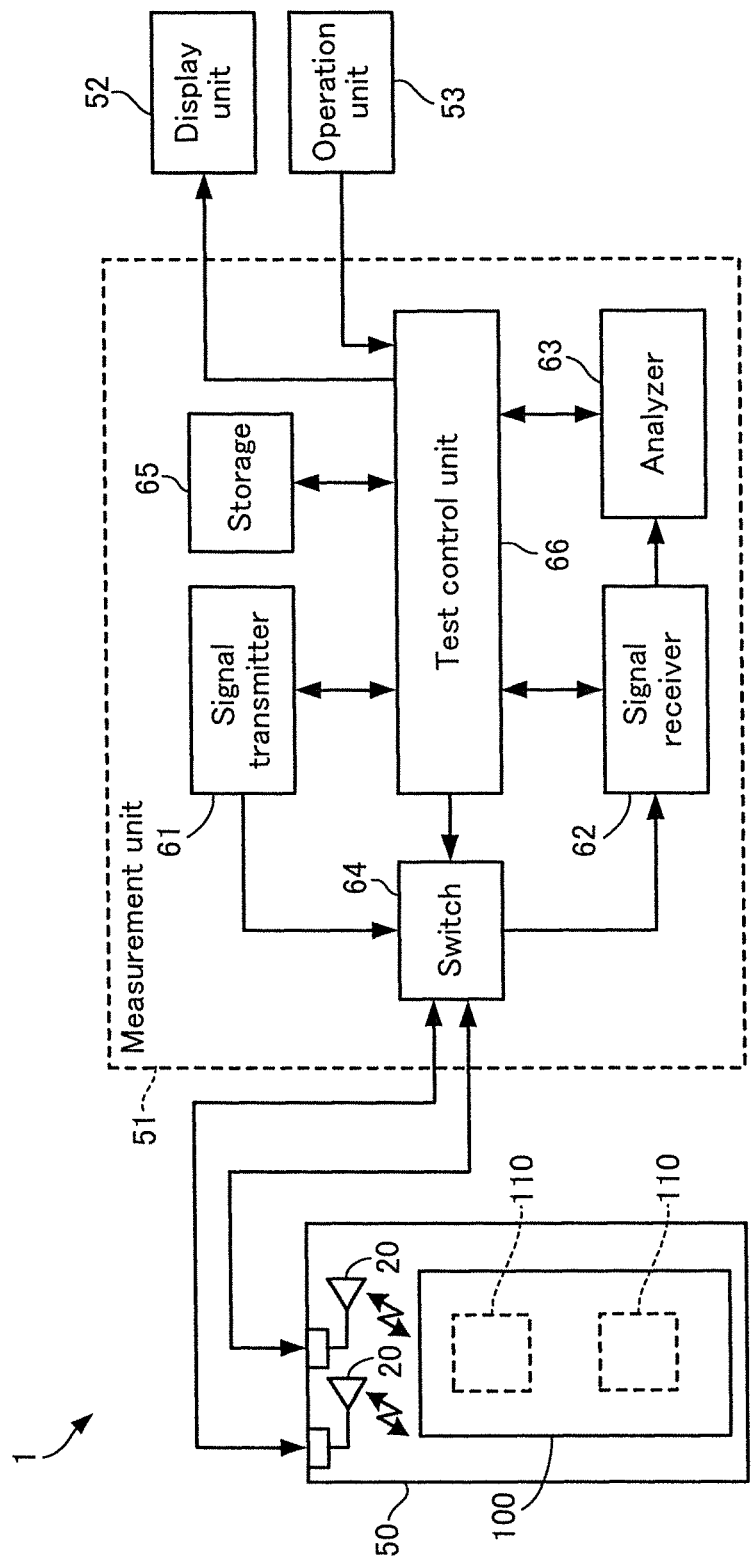
FIG. 1 is a block diagram showing the configuration of a wireless terminal measurement apparatus according to a first embodiment of the present invention.

As shown in FIG. 1, a wireless terminal measurement apparatus 1 according to the first embodiment of the present invention inputs a test signal to a device under test (DUT) 100 having one or more antennas 110, and measures a response signal output from the DUT 100 to obtain transmission and reception characteristics. For example, the wireless terminal measurement apparatus 1 includes circularly polarized antennas 20, a terminal holder 50, a measurement unit 51, a display unit 52, and an operation unit 53. Here, the circularly polarized antennas 20 and the terminal holder 50 constitute a circularly polarized antenna device connectable to the wireless terminal measurement apparatus 1.

The DUT 100 is a wireless terminal such as a smartphone. Examples of communication standards for the DUT 100 include, but are not limited to, cellular system (LTE, LTE-A, W-CDMA (registered trademark), GSM (registered trademark), CDMA2000, 1×EV-DO, TD-SCDMA, and the like), wireless LAN (IEEE 802.11b/g/n/ac/ad, and the like), Bluetooth (registered trademark), GNSS (GPS, Galileo, GLONASS, BeiDou, and the like), FM, and digital broadcasting (DVB-H, ISDB-T, and the like).

Figure 2A:
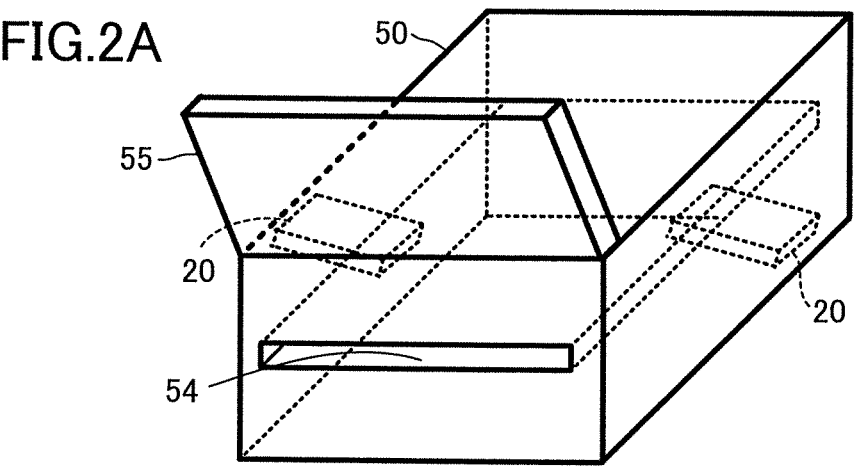
FIGS. 2A, 2B and 2C are perspective views showing how a DUT is held by a terminal holder provided in the wireless terminal measurement apparatus according to the first embodiment of the present invention.
Figure 2B:
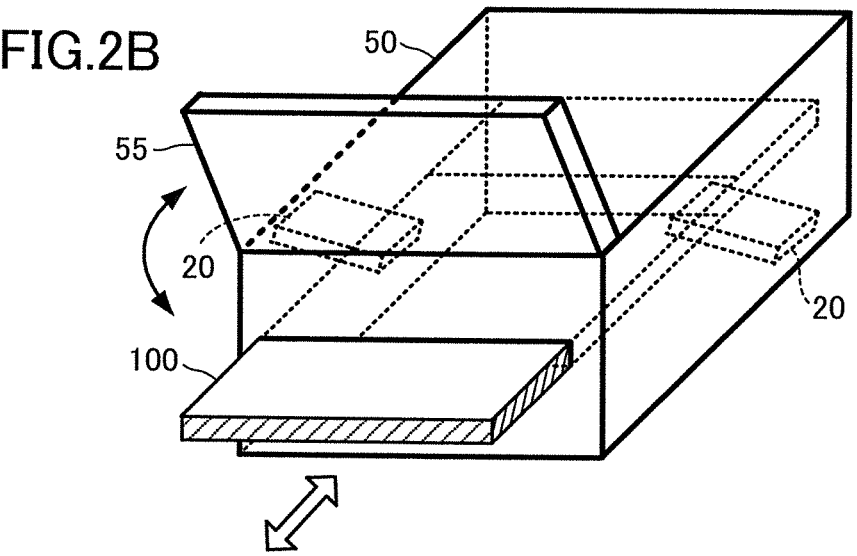
Figure 2C:
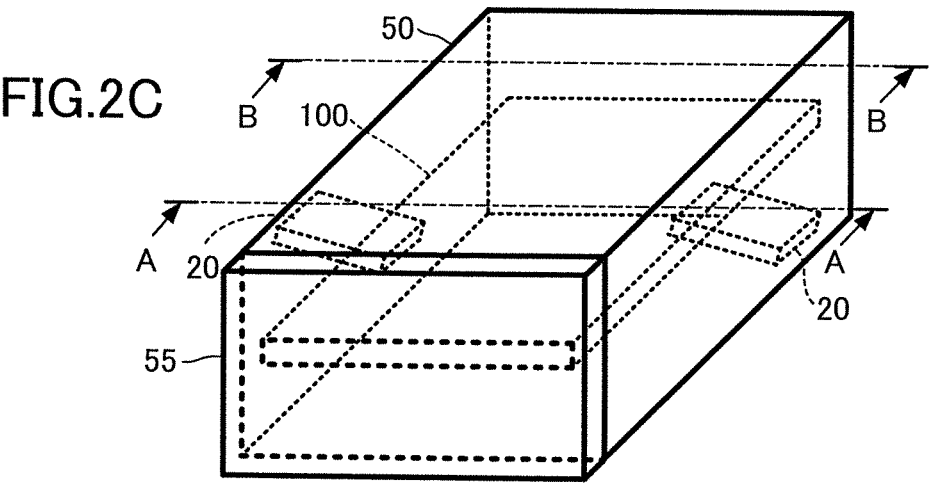

As shown in FIGS. 2A and 2B, the terminal holder 50 is, for example, made of dielectric material having a rectangular outer shape. The terminal holder 50 has a slot 54 into and from which the DUT 100 can be inserted and extracted. The terminal holder 50 has one or more circularly polarized antennas 20 inside the terminal holder 50. Further, the terminal holder 50 may have a door 55 for opening and closing an opening of the slot 54. As shown in FIG. 2C, the DUT 100 is accommodated and held in the terminal holder 50 such that the positional relationship between the antennas 110 provided on one surface of the. DUT 100 and the circularly polarized antennas 20 is fixed.

Figure 3A:
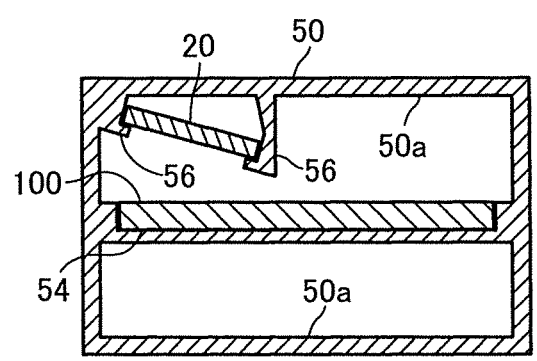
FIG. 3A is a cross-sectional view taken along line A-A of FIG. 2C.
Figure 3B:
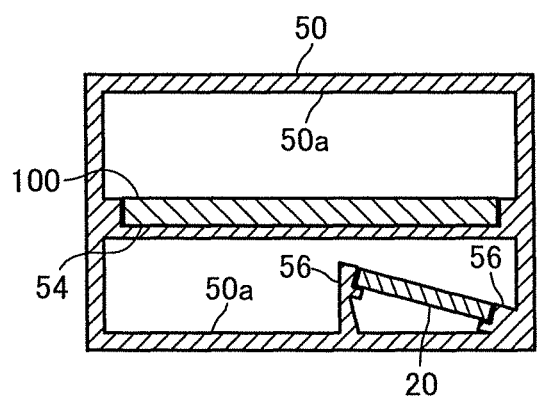
FIG. 3B is a cross-sectional view taken along line B-B of FIG. 2C.

FIGS. 3A and 3B are a cross-sectional view taken along line A-A and a cross-sectional view taken along line B-B of FIG. 2C, respectively. As shown in these figures, the terminal holder 50 has holding portions 56 for holding the circularly polarized antennas 20 inclined at a predetermined angle with respect to the radiation surface of the antenna 110 of the DUT 100. It is desirable that a radio wave absorber for preventing electromagnetic waves generated by the antennas 110 of the DUT 100 and/or the circularly polarized antennas 20 from leaking out of the terminal holder 50 is attached to an inner wall surface 50a of the terminal holder 50.

Alternatively, the terminal holder 50 may be configured like a fastener to which one or more circularly polarized antennas 20 are attached. In this case, the positional relationship between the antenna 110 of the DUT 100 and the circularly polarized antenna 20 is fixed by sandwiching the DUT 100 with the terminal holder 50.

As shown in FIG. 1, the measurement unit 51 includes a signal transmitter 61, a signal receiver 62, an analyzer 63, a switch 64, a storage 65, and a test control unit 66. The measurement unit 51 measures an output level of a radio wave transmitted from the DUT 100, a reception sensitivity of the DUT 100, and the like.

The signal transmitter 61 is configured to output a test signal to the circularly polarized antenna 20 so as to output the test signal to the DUT 100, held by the terminal holder 50, via the circularly polarized antennas 20 and the antennas 110 of the DUT 100.

The signal receiver 62 is configured to receive a signal to be measured (hereinafter referred to as "measurement signal") output from the DUT 100 to which the test signal was input, by the circularly polarized antennas 20 via the antennas 110 of the DUT 100.

The analyzer 63 performs analysis processing in accordance with a communication standard applied to the DUT 100 on the measurement signal received by the signal receiver 62. Specific examples of the analysis processing performed by the analyzer 63 include, but not limited to, measurements of a modulation accuracy (EVM), a transmission power level, a transmission spectrum mask, an error vector amplitude, a minimum input sensitivity, a maximum input level, an adjacent channel leakage power, and a spurious emission.

It is noted that the test signal includes a control signal for performing various controls in accordance with the communication standard applied to the DUT 100, such as making the DUT 100 call-connected to the wireless terminal measurement apparatus 1 of the present embodiment. Further, the above-mentioned measurement signal is a response signal from the DUT 100 in response to the test signal output from the wireless terminal measurement apparatus 1 of the present embodiment, or a transmission signal output from the DUT 100 irrespective of the test signal.

The switch 64 is a broadband directional coupler that passes a signal having a frequency of the test signal output from the signal transmitter 61, and is configured by, for example, a Wilkinson power divider. The switch 64 is connected to the circularly polarized antennas 20 by coaxial cables. The switch 64 is capable of inputting the test signal output from the signal transmitter 61 to the circularly polarized antennas 20, and inputting to the signal receiver 62 the measurement signal transmitted from the DUT 100 and received by the circularly polarized antennas 20.

The test control unit 66 is configured by, for example, a microcomputer, a personal computer, or the like including a CPU (Central Processing Unit), a ROM (Read Only Memory), a RAM (Random Access Memory), an HDD (Hard Disk Drive), and the like. The ROM, RAM, and HDD constitute the storage 65. The test control unit 66 controls the operation of the above elements constituting the measurement unit 51.

The signal transmitter 61, the signal receiver 62, and the analyzer 63 may be constituted by a digital circuit such as an FPGA (Field Programmable Gate Array) and an ASIC (Application Specific Integrated Circuit), or may be constituted as software by executing a predetermined program, stored in the storage 65 in advance, by the test control unit 66. Alternatively, the signal transmitter 61, the signal receiver 62, and the analyzer 63 may be configured by appropriately combining hardware processing by a digital circuit and software processing by a predetermined program. It should be noted that the test control unit 66 can externally receive a new program or a version-changed program, and add the program to the storage 65 or update the program.

The display unit 52 is constituted by a display device such as an LCD and a CRT. The display unit 52 displays, based on a control signal from the test control unit 66, measurement results and operation objects such as soft keys, pull-down menus, and text boxes for setting measurement conditions and the like.

The operation unit 53 is a unit for performing an input operation, by the user, and is configured by, for example, a touch panel provided on the surface of a screen of the display unit 52. Alternatively, the operation unit 53 may include an input device such as a keyboard and a mouse. Further, the operation unit 53 may be constituted by an external control device that performs remote control by a remote command or the like. The input operation with the operation unit 53 is detected by the test control unit 66. The user can use the operation unit 53 to select a communication standard supported by the DUT 100 from among a plurality of communication standards.

The configuration of the circularly polarized antenna 20 will be described. FIGS. 4 to 8 show the basic structure of the circularly polarized antenna 20.

Figure 4:
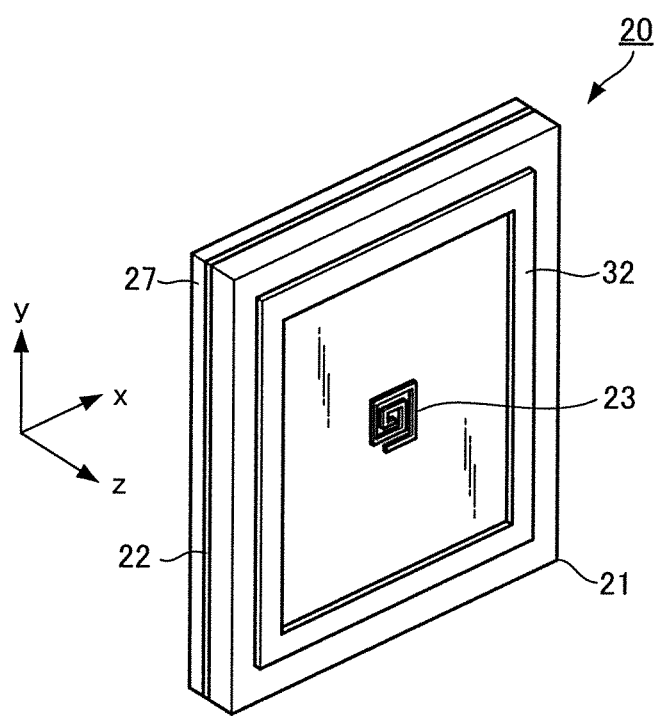
FIG. 4 is a perspective view showing the configuration of a circularly polarized antenna provided in the wireless terminal measurement apparatus according to the first embodiment of the present invention.
Figure 5A:
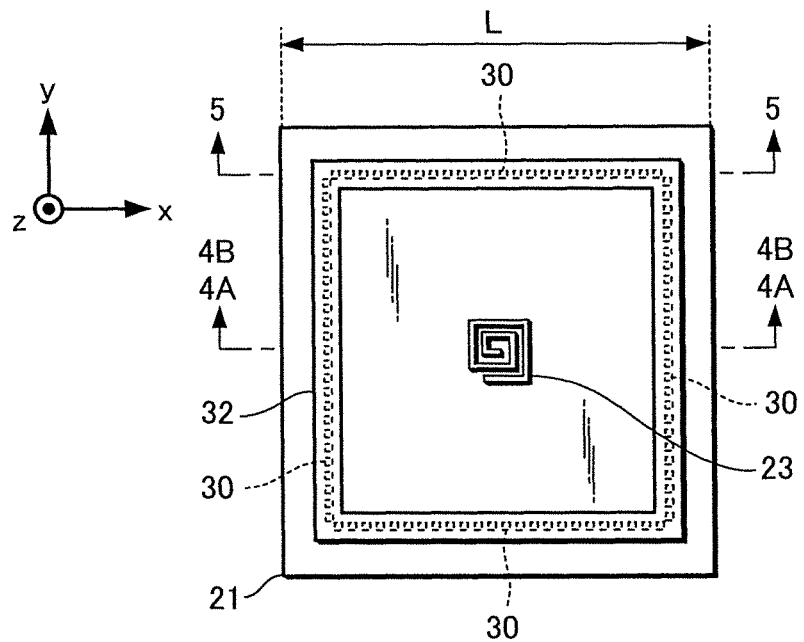
FIG. 5A is a front view showing the configuration of LHCP of the circularly polarized antenna according to the first embodiment of the present invention.
Figure 5B:
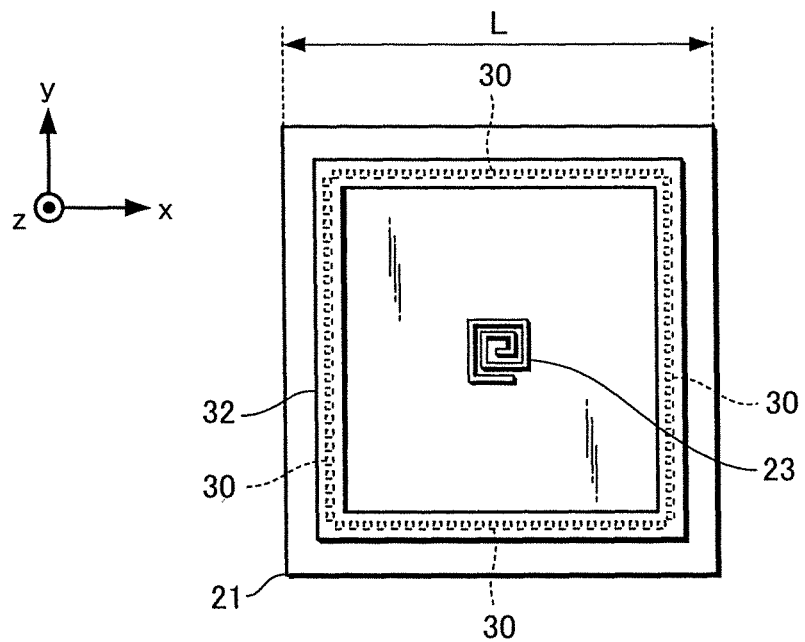
FIG. 5B is a front view showing the configuration of RHCP of the circularly polarized antenna according to the first embodiment of the present invention.
Figure 6:
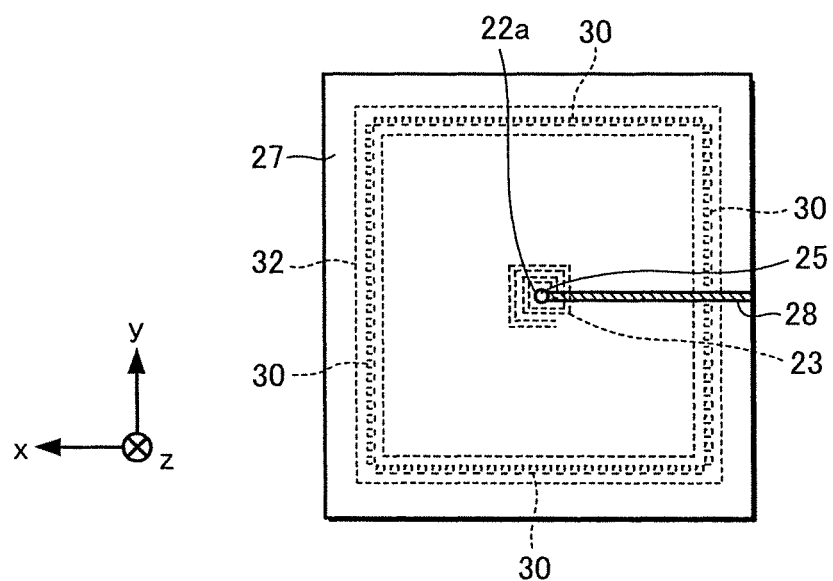
FIG. 6 is a rear view showing the configuration of the circularly polarized antenna according to the first embodiment of the present invention.
Figure 7A:
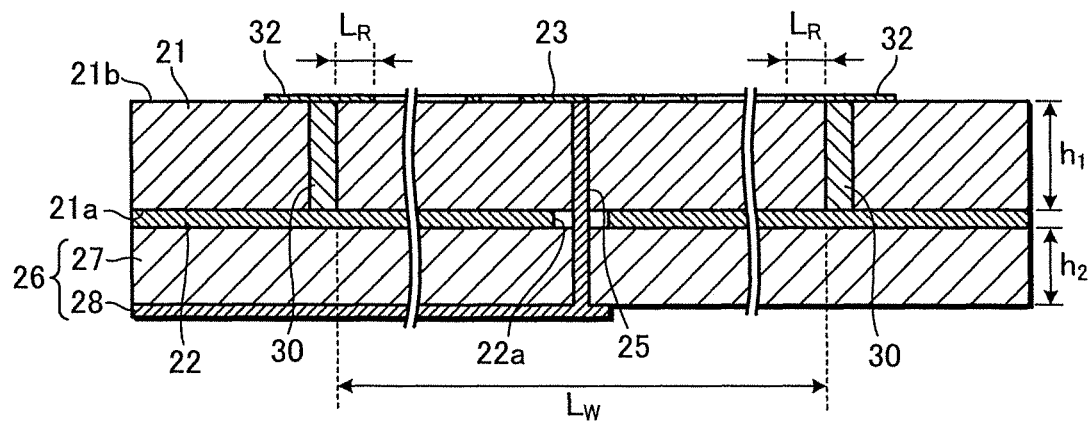
FIG. 7A is an enlarged cross-sectional view taken along line 4A-4A of FIG. 5A.
Figure 7B:
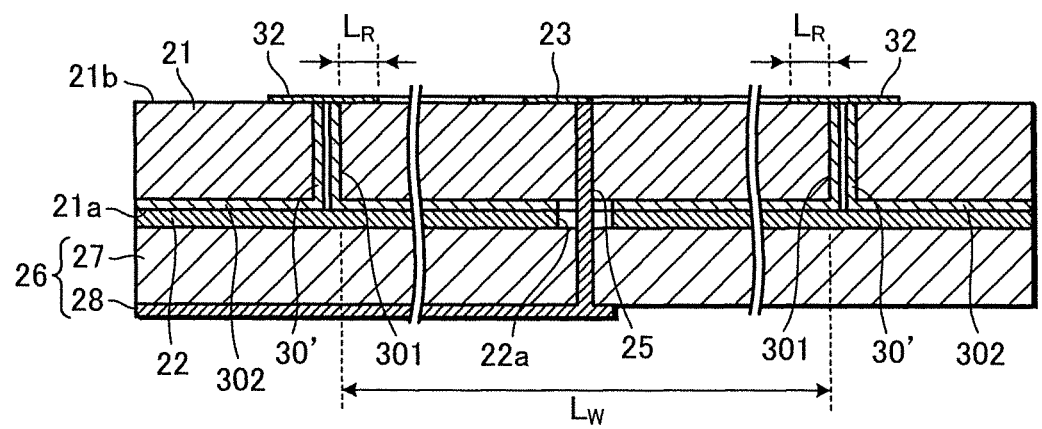
FIG. 7B is an enlarged cross-sectional view taken along line 4B-4B of FIG. 5A in a modified example.
Figure 8:
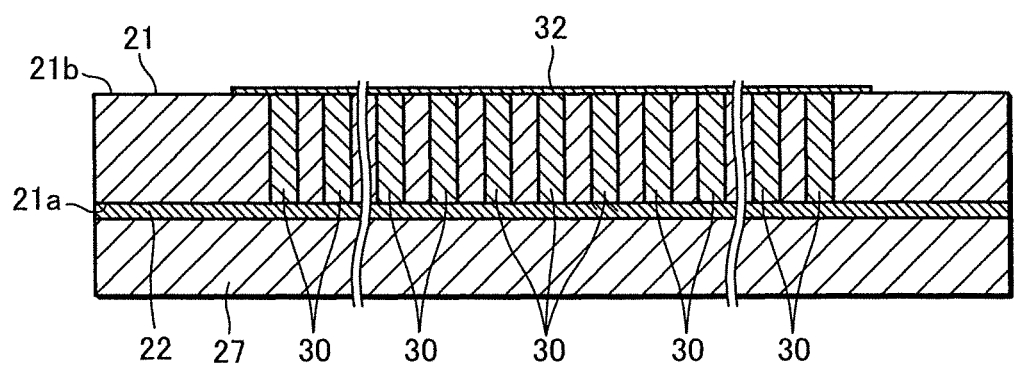
FIG. 8 is an enlarged cross-sectional view taken along line 5-5 of FIG. 5A.

FIG. 4 is a perspective view illustrating the configuration of the circularly polarized antenna 20. FIGS. 5A and 5B are front views illustrating the configuration of the circularly polarized antenna 20. FIG. 6 is a rear view illustrating the configuration of the circularly polarized antenna 20. FIG. 7A is an enlarged cross-sectional view taken along line 4A-4A of FIG. 5A. FIG. 7B is an enlarged cross-sectional view taken along line 4B-4B of FIG. 5A in a modified example. FIG. 8 is an enlarged cross-sectional view taken along line 5-5 of FIG. 5A.

As shown in FIGS. 4 to 8, the circularly polarized antenna 20 according to the present embodiment basically includes a dielectric substrate 21, a ground conductor 22 piled up on one surface 21a side of the dielectric substrate 21, and a circularly polarized antenna element 23 formed on the opposite surface 21b of the dielectric substrate 21. The opposite surface 21b of the dielectric substrate 21 is referred to as the first surface of the dielectric substrate 21, and the surface 21a of the dielectric substrate 21 is referred to as the second surface of the dielectric substrate 21.

Further, a feed unit 26 for feeding an excitation signal to the antenna element 23 is formed at an opposite side of the dielectric substrate 21 with the ground conductor 22 sandwiched in between the dielectric substrate 21 and the feed unit 26. The feed unit 26 includes a feeding dielectric substrate 27 and a feeding line 28 formed on one surface of the feeding dielectric substrate 27. The other surface of the feeding dielectric substrate 27 faces the ground conductor 22. The feeding line 28 is a microstrip line with the ground conductor 22 that is grounded.

As the above-described dielectric substrate 21 and the feeding dielectric substrate 27, a material such as a quasi-millimeter waveband and low-loss RO4003 (Rogers Corporation) can be used.

As a material of the dielectric substrate 21 and the feeding dielectric substrate 27, a low-loss material having a dielectric constant of about 2 to 5 can be used. Examples thereof include glass cloth Teflon substrates and various thermosetting resin substrates. For example, in the configuration shown in FIG. 7A, both the dielectric substrate 21 and the feeding dielectric substrate 27 have a dielectric constant of 3.62, the dielectric substrate 21 has a height $h_1$ of 1.1 mm, and the feeding dielectric substrate 27 has a height $h_2$ of 0.3 mm.

The antenna element 23 is a right-handed rectangular spiral unbalanced antenna (see FIG. 5A) or a left-handed rectangular spiral unbalanced antenna (see FIG. 5B), which is formed by, for example, a pattern printing technology on the opposite surface 21b side of the dielectric substrate 21.

The circularly polarized antenna 20 has a feed pin 25 one end of which is connected to a side end portion (feeding point) at the spiral center side of the antenna element 23. The feed pin 25 penetrates the dielectric substrate 21 in a direction of thickness thereof to pass through a hole 22a of the ground conductor 22 without contacting thereto, and further penetrates the feeding dielectric substrate 27 configuring the feed unit 26 to project the other end side of the teed pin 25 on the surface of the feeding dielectric substrate 27.

It is noted that the feed unit 26 is not limited to the configuration of the microstrip line described above. The feed unit 26 may be fed with power from the other end side of the feed pin 25 by an unbalanced feeder line, for example, a coaxial cable, a coplanar waveguide using the ground conductor 22 as a ground, a microstrip line, or the like. The circularly polarized antenna 20 having the configuration shown in FIG. 5A is fed with power from the feed pin 25 so that a left hand circular polarization (LHCP) radio wave having a left-handed rotation direction of main polarization can be radiated from the antenna element 23. On the other hand, the circularly polarized antenna 20 having the configuration shown in FIG. 5B is fed with power from the feed pin 25, so that a right hand circular polarization (RHCP) radio wave having a right-handed rotation direction of the main polarization can be radiated from the antenna element 23. The figures after FIG. 6 show only the configuration that the main polarization is LHCP unless otherwise noted.

However, in the circularly polarized antenna based solely on the above-described structure, a surface wave along the surface of the dielectric substrate 21 is excited. Accordingly, desired characteristics as the circularly polarized antenna cannot be obtained due to the influence of the surface wave.

Therefore, in the circularly polarized antenna 20 of the present embodiment, a cavity structure is adopted as a structure for suppressing the excitation of the surface wave along the surface of the dielectric substrate 21, in addition to the above-described structure. The cavity structure is configured by a plurality of metal posts 30 as shown ire FIGS. 7A and FIG. 8.

Specifically, a plurality of, for example, columnar metal posts 30, have one ends and the other ends. The one ends are connected to the ground conductor 22. The metal posts 30 penetrate the dielectric substrate 21 along a direction of thickness thereof. The other end sides of the metal posts 30 extend up to the opposite surface 21b of the dielectric substrate 21. The metal posts 30 are arranged at predetermined intervals so as to surround the antenna element 23 thereby forming a cavity.

The circularly polarized antenna 20 of the present embodiment further includes, in addition to the above-described cavity structure, a frame-shaped conductor 32 on the opposite surface 21b side of the dielectric substrate 21. The frame-shaped conductor 32 short-circuits the other end sides of the plurality of metal posts 30 sequentially along the arrangement direction thereof. The frame-shaped conductor 32 extend from the connecting or contacting position with each metal post 30 in a direction of the antenna element 23 by a predetermined distance.

In the circularly polarized antenna 20 of this embodiment, a surface wave can be suppressed by a synergistic effect of the cavity structure and the frame-shaped conductor 32. In other words, the circularly polarized antenna 20 of this embodiment is provided with the cavity structure and the frame-shaped conductor 32 so that leakage of radio waves from a side surface of the circularly polarized antenna 20 can be greatly reduced as compared with a conventional planar antenna.

As shown in FIG. 7B, the plurality of metal posts 30 can be realized as a plurality of hollow metal posts 30'. The hollow metal posts 30' may be formed by forming a plurality of holes 301 penetrating the dielectric substrate 21, and then plating (through-hole plating) inner walls of the plurality of holes 301.

In this case, lower ends of the plurality of hollow metal posts 30' formed by through-hole plating are connected to the ground conductor 22 via lands 302 formed by a pattern printing technology on the one surface 21a side of the dielectric substrate 21.

Figure 9A:
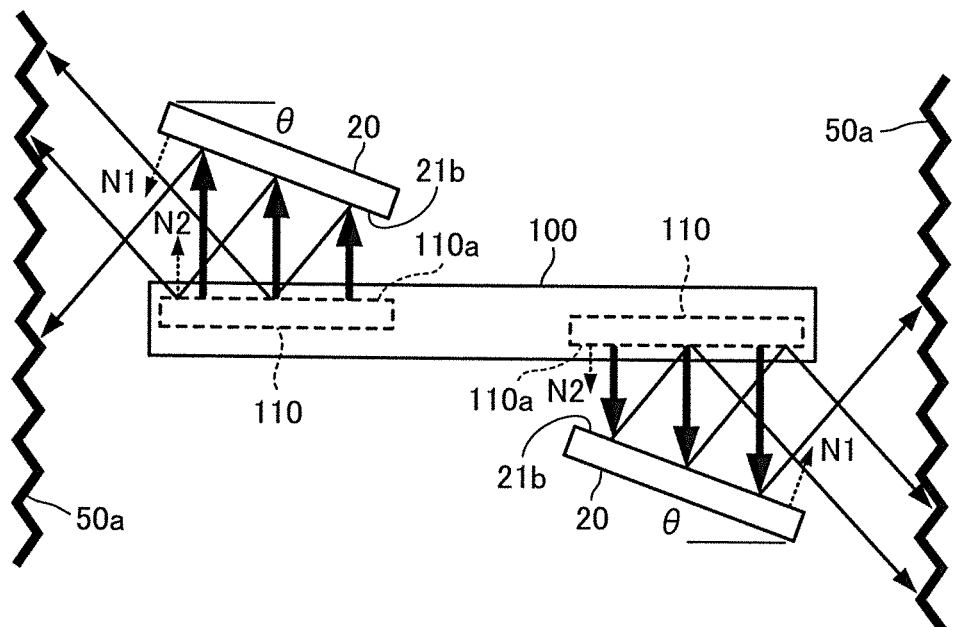
FIGS. 9A and 9B are schematic diagrams showing examples of a positional relationship between the circularly polarized antenna and an antenna of the DUT according to the first embodiment of the present invention.
Figure 9B:
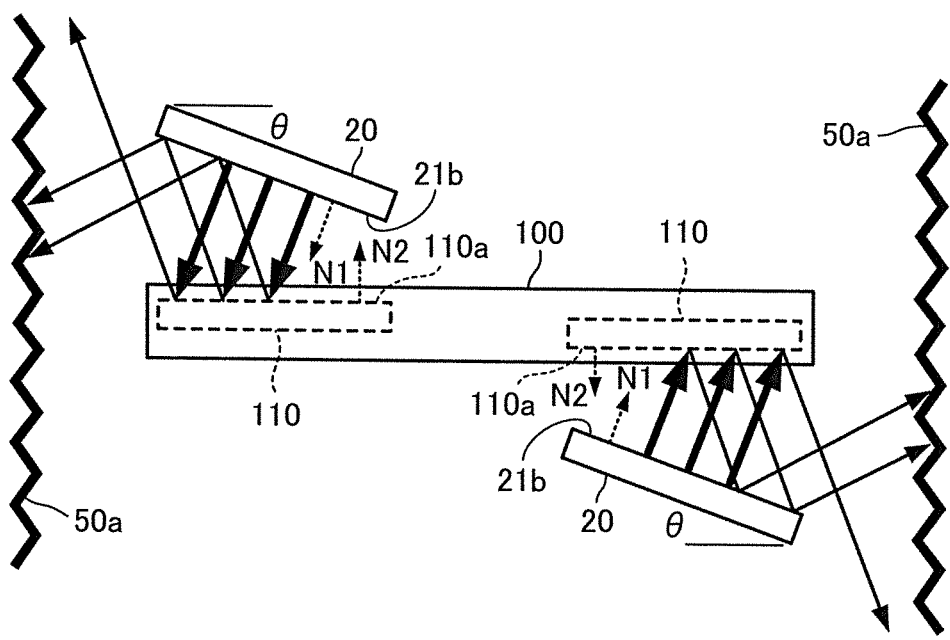

As shown in FIGS. 9A and 9B, the circularly polarized antennas 20 configured as described above are held by the terminal holder 50 so that the opposite surfaces 21b of the dielectric substrates 21 face radiation surfaces 110a of the antennas 110 of the DUT 100 and any one surface of the DUT 100, thereby leading to spatial couplings between the circularly polarized antennas 20 and the antennas 110.

As shown in FIGS. 9A and 9B, the opposite surfaces 21b of the circularly polarized antennas 20 are not parallel to the radiation surfaces 110a of the antennas 110 of the DUT 100, but are inclined by an inclination angle θ. That is, a normal line of one surface of the DUT 100 having the antenna 110 installed therein and a normal line of the opposite surface 21b of the circularly polarized antenna 20 intersect with each other.

Here, a normal line N2 of the radiation surface 110a of each antenna 110 and a normal line of one surface of the DUT 100 having the antenna 110 installed therein are parallel to each other. Further, a radiation direction of each antenna 110 is equal to a normal direction of the radiation surface 110a of the antenna 110.

Further, a normal line N1 of the opposite surface 21b of each circularly polarized antenna 20 and a normal line of the radiation surface of the circularly polarized antenna 20 are parallel to each other. A radiation direction of each circularly polarized antenna 20 is equal to a normal direction of the radiation surface of the circularly polarized antenna 20.

That is, as shown in FIG. 9A, a radiation direction of the measurement signal radiated from the radiation surface 110a of each antenna 110 is not parallel to the normal direction N1 of the opposite surface 21b of the corresponding circularly polarized antenna 20. Therefore, the measurement signal radiated from the radiation surface 110a of each antenna 110 is reflected between the circularly polarized antenna 20 and the antenna 110, is directed toward an inner wall surface 50a of the terminal holder 50, and is absorbed by the inner wall surface 50a. In this manner, multiple reflections of the measurement signal between the circularly polarized antenna 20 and the antenna 110 are suppressed.

Similarly, as shown in FIG. 9B, a radiation direction of the test signal radiated from the antenna element 23 of each circularly polarized antenna 20 is not parallel to the normal direction N2 of the radiation surface 110a of the corresponding antenna 110. Therefore, the test signal radiated from each circular polarized antenna 20 is reflected between the circular polarized antenna 20 and the corresponding antenna 110, is directed toward the inner wall surface 50a of the terminal holder 50, and is absorbed by the inner wall surface 50a. In this manner, multiple reflections of the test signal between the circularly-polarized antenna 20 and the antenna 110 are suppressed.

It is noted that the positions and the number of the circularly polarized antennas 20 in the terminal holder 50 are not limited to the examples shown in FIG. 2, FIG. 3, and FIG. 9.

In order to explain the effect of the surface wave suppression by the above-described cavity structure and the frame-shaped conductor 32, structural parameters of respective portions and results of simulation of a characteristic of the circularly polarized antenna 20 will be described. The results of simulation were obtained by changing the structural parameters.

First, factors as the structural parameters of the respective portions will be described.

A usable frequency of the circularly polarized antenna 20 is 18 to 40 GHz, which is within K and Ka bands. A rectangular spiral of the antenna element 23 has a predetermined number of turns interlinked with one another. Each turn has a conductive line arranged at each angle of 90°, and has a length of a0 or an integer multiple of a0, where a0 is a basic length.

Figure 10A:
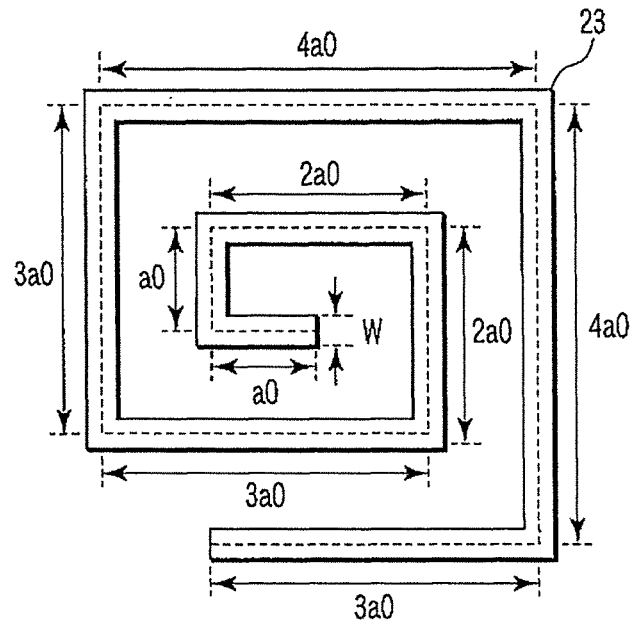
FIG. 10A is an enlarged front view showing the configuration of a math part of the circularly polarized antenna according to the first embodiment of the present invention.

A typical example of such a rectangular spiral is shown in FIG. 10A. That is, in this example, an element width W is made to be 0.25 mm, the basic length a0 is made to be 0.45 mm, and hereinafter, the line lengths are made to be 2a0, 2a0, 3a0, 3a0, 4a0, and 4a0 at each angle of 90°, and the final line length is made to be 3a0, which makes a rectangular spiral of nine-turn spiral in all.

Figure 10B:
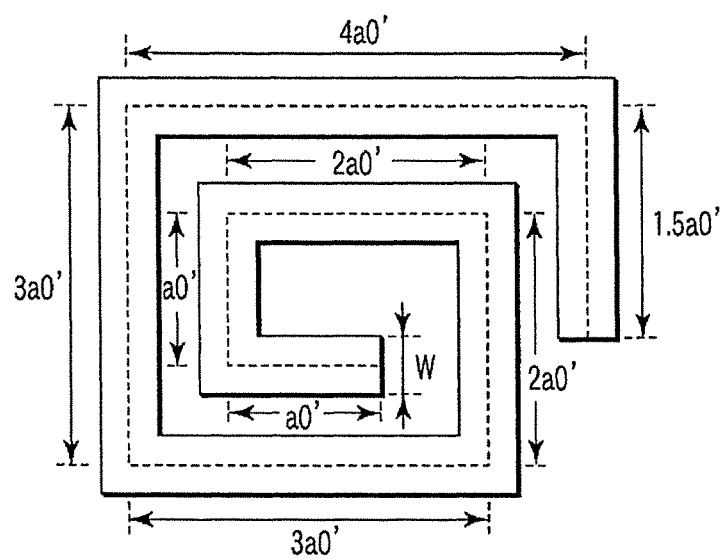
FIG. 10B is an enlarged front view showing the configuration of a modified example of the main part of the circularly polarized antenna according to the first embodiment of the present invention.

Further, in the case of the rectangular spiral shown in FIG. 10B, a basic length a0' is made longer than the basic length a0 in FIG. 10A, and the number of turns is reduced.

In this example, an element width W is made to be 0.25 mm, a basic length a0' is made to be 0.7 mm, and hereinafter, line lengths are made to be 2a0', 2a0', 3a0', 3a0', and 4a0' at each angle of 90°, and the final line length is made to be about 1.5 a0', which makes a rectangular spiral of eight-turn spiral in all.

In this case, the final line length is selected to be about 1.5 a0' so as to optimize an axial ratio and a reflection characteristic of circular polarization.

Note that, in the following description and embodiment, an example of a rectangular spiral is shown as the antenna element 23 to be uses for the circularly polarized antenna 20.

Figure 11:
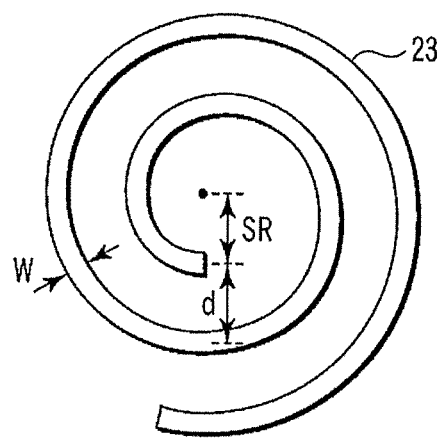
FIG. 11 is an enlarged front view showing the configuration of another modified example of the main part of the circularly polarized antenna according to the first embodiment of the present invention.

However, as shown in FIG. 11, a circular spiral antenna element 23 can be used as the antenna element 23 to be used for the circularly polarized antenna 20 in place of a rectangular spiral.

The circular spiral antenna element 23 shown in FIG. 11 is a case of the antenna element 23 formed from a circular spiral in which, for example, a radius initial value SR=0.2 mm from a point of reference, an element width W=0.35 mm, a spiral interval d=0.2 mm, and the number of turns is 2.125. Even when the antenna element 23 formed from such a circular spiral is used as the circularly polarized antenna 20, substantially the same result as that in the case of using the rectangular spiral antenna element 23 described above is obtained.

Further, an outward form of the dielectric substrate 21 is a square centering around the spiral center of the antenna element 23, As shown in FIG. 5A and FIG. 5B, a length of one side thereof is defined as L (hereinafter referred to as an outward form length), and an outward form of the cavity is also made to be a square concentric therewith.

As shown in FIGS. 7A and 7B, it is assumed that an inside dimension of the cavity is Lw. The frame-shaped conductor 32 is provided with a conducting rim having a predetermined width (hereinafter referred to as a rim width) $L_R$ extending inward from the inner wall of the cavity.

Further, diameters of the plurality of metal posts 30 forming the cavity are respectively 0.3 mm, and intervals between the respective metal posts 30 are 0.9 mm.

Figure 12:
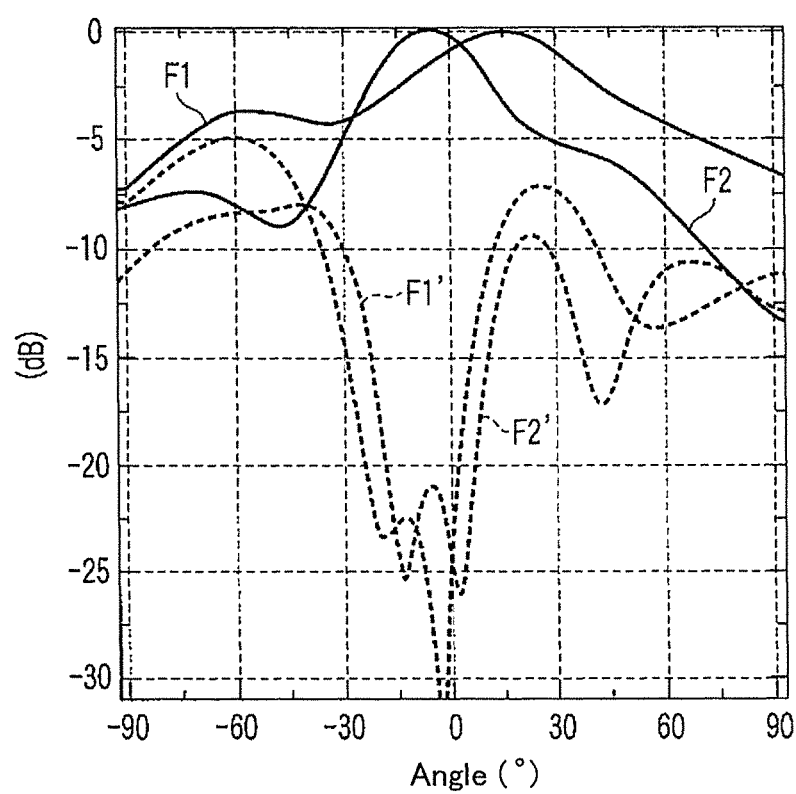
FIG. 12 is a characteristic diagram in the case where the configuration of the main part of the circularly polarized antenna according to the first embodiment of the present invention is removed.

FIG. 12 shows results of simulations of a radiation characteristic of a vertical plane (the y-z plane in FIGS. 4 and 5) in the case where a cavity formed by the plurality of metal posts 30 and the frame shaped conductor 32 are not provided.

In FIG. 12, F1 and F1' are characteristics of main polarization (left hand circular polarization: LHCP) and cross polarization (right hand circular polarization: RHCP), respectively, in the case of an outward form length L=18 mm. In FIG. 12, F2, F2' are characteristics of main polarization and cross polarization, respectively, in the case of an outward form length L=24 mm.

Here, a radiation characteristic required as a circularly polarized antenna is a single-peaked characteristic which is symmetric and broad, centering on a direction of 0° with respect to main polarization, and is required to be a radiant intensity sufficiently lower than that of main polarization within a broad angle range with respect to cross polarization (which is zero in the case of a complete circular polarization).

In contrast thereto, the characteristics F1 and F2 of main polarizations in FIG. 12 are dissymmetric and there are large disturbances in gains. It can be understood that the cross polarizations are at radiation levels which are equivalent to or close to those of the main polarizations in the vicinity of −60° and −40°.

Such disturbances in radiant characteristics are brought about under the influence of the surface wave described above.

Figure 13:
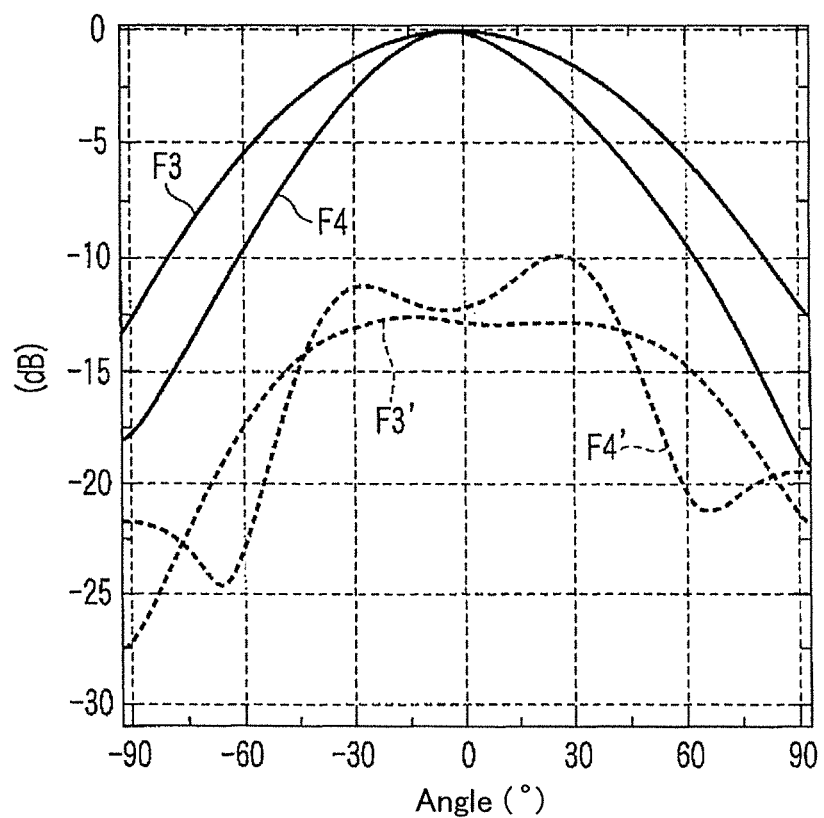
FIG. 13 is a characteristic diagram in the case where the configuration of the main part of the circularly polarized antenna according to the first embodiment of the present invention is used.

FIG. 13 shows results of simulations with respect to characteristics F3 and F4 of main polarizations and characteristics F3' and F4' of cross polarizations in the case of outward form lengths L=18 mm and L=24 mm, when a cavity whose inside dimension Lw=9 mm is provided by the plurality of metal posts 30 and the frame-shaped conductor 32 whose rim width $L_R$=1.2 mm is provided.

As is clear from FIG. 13, the characteristics F3 and F4 of the main polarizations are made single-peaked characteristics which are symmetric and broad centering on a direction of 0°. Thus, it can be understood that, with respect to the characteristics F3'and F4' of the cross polarizations as well, there are slow changes in radiant intensities which are sufficiently lower than the main polarizations F3 and F4 within a broad angle range, and desired characteristics required as the circularly polarized antenna described above are obtained.

As a result of the simulations with respect to various radiation characteristics in the same manner as described above, the simulations being carried out with the structural parameters of the respective portions being changed, it has been proved that radiation characteristics when there is no conducting rim 32 show the dependency onto an outward form length L and a cavity inside dimension Lw of the dielectric substrate 21. It has been also proved that, to show a summarized trend, when an outward form length L is large (L=24, 18 mm), main polarization characteristic is made closer from a triple-peaked form to a single-peaked form as a cavity inside dimension Lw is made larger from 3 to 10 mm.

Further, it has been proved that, when an outward form length L of the dielectric substrate 21 is relatively small (L=12 mm), the main polarization characteristic is made closer from a doubles peaked form to a single-peaked form as a cavity inside dimension Lw is made larger from 3 to 10 mm.

However, it has been proved that, in both cases, disturbances in the cross polarizations are large and a difference with main polarization component is made smaller within a usable angle range, and the polarization selectivity is low, which is insufficient as regards desired characteristics as described in FIG. 13.

Note that 1.2 mm, which is the rim width $L_R$, corresponds to approximately ¼ of a wavelength of a surface wave propagating along the surface of the dielectric substrate 21. Namely, the portion with the rim width $L_R$=1.2 mm forms a transmission channel with a length of λg/4 (λg is a wavelength in waveguide) by which an impedance reaches an infinite value with respect to a surface wave as the post wall side is seen from the tip side.

Accordingly, electric current along the surface of the dielectric substrate 21 does not flow, and excitation of a surface wave is suppressed by this electric current inhibition, which prevents disturbances in radiation characteristics.

Therefore, when the circularly polarized antenna 20 is applied to a frequency band other than that described above, it suffices to set the, rim width $L_R$ in accordance with the frequency.

Incidentally, it can be thought that, in the circularly polarized antenna 20 of this embodiment, a resonator is configured by providing the cavity due to the plurality of metal posts 30 and the frame-shaped conductor 32 on the dielectric substrate 21, and that the resonator is excited by the circularly polarized antenna elements 23.

Because the resonator is configured in the circularly polarized antenna 20 of the present embodiment, there is a resonant frequency. At the resonant frequency, since an input impedance of the circularly polarized antenna 20 is made extremely large, the antenna stops radiation.

In is case, a resonant frequency of the resonator is determined based on the structural parameters of the resonator and the circular polarized antenna elements 23.

The structural parameters are, as described above, the number of turns of the antenna element 23, the basic length a0 of the antenna element 23, a line width W of the antenna element 23, and the like in addition to the inside dimension Lw of the cavity and the rim width $L_R$.

Accordingly, a frequency characteristic of an antenna gain brings about a rapidly deep notch in the vicinity of the resonator frequency. This resonance frequency can be set to a desired value by adjusting the above-described structural parameters.

Results of measurements of $S_{11}$ and $S_{21}$ of the circularly polarized antenna 20 in the present embodiment will be described.

Figure 14A:
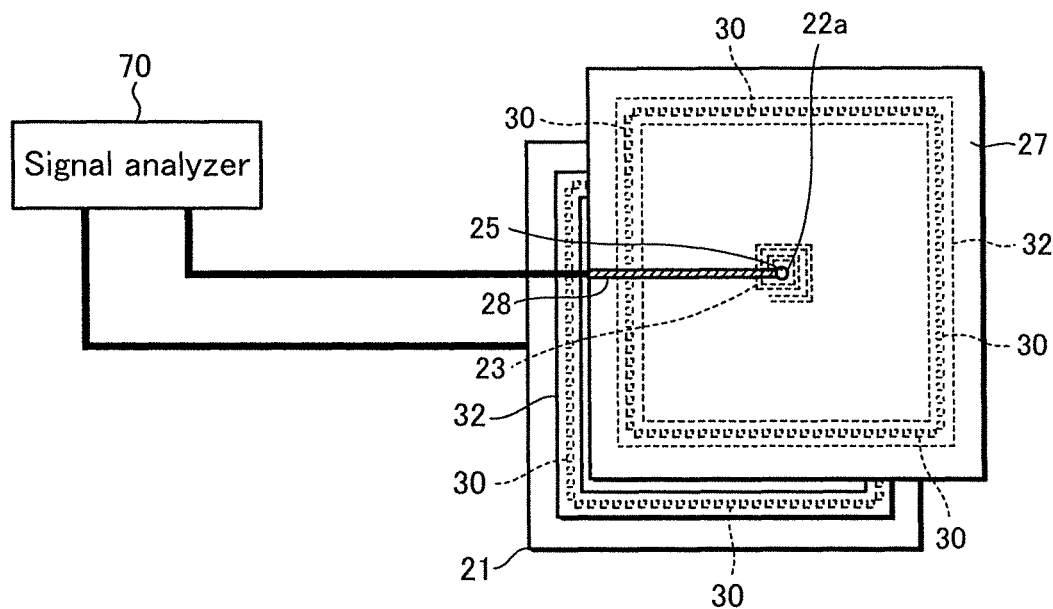
FIG. 14A is a schematic diagram showing the configuration for measuring $S_{11}$ and $S_{21}$ of the circularly polarized antenna according to the first embodiment of the present invention.
Figure 15:
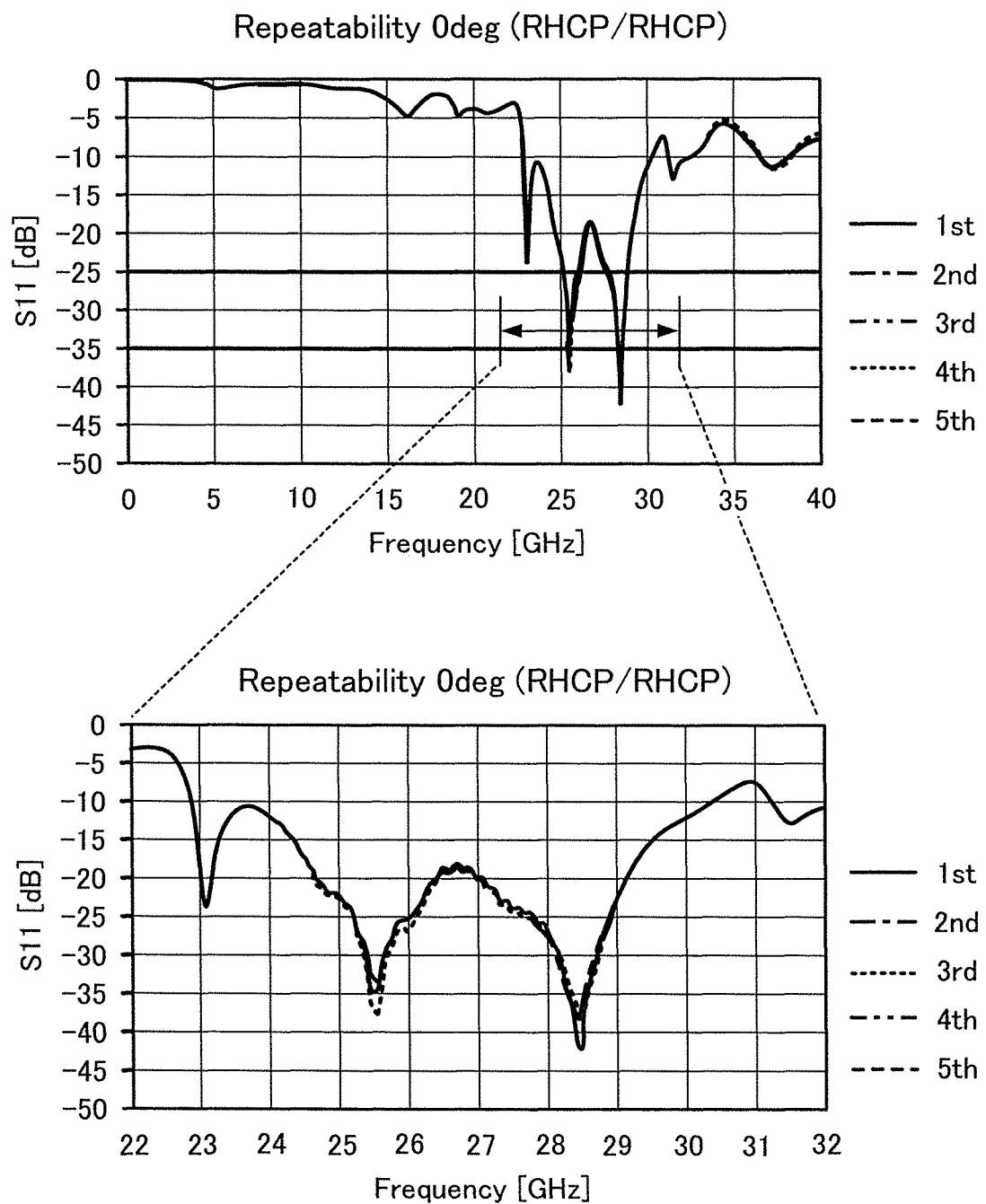
FIG. 15 is a graph showing $S_{11}$, measured with the configuration of FIG. 14A, of the circularly polarized antenna according to the first embodiment of the present invention.
Figure 16:
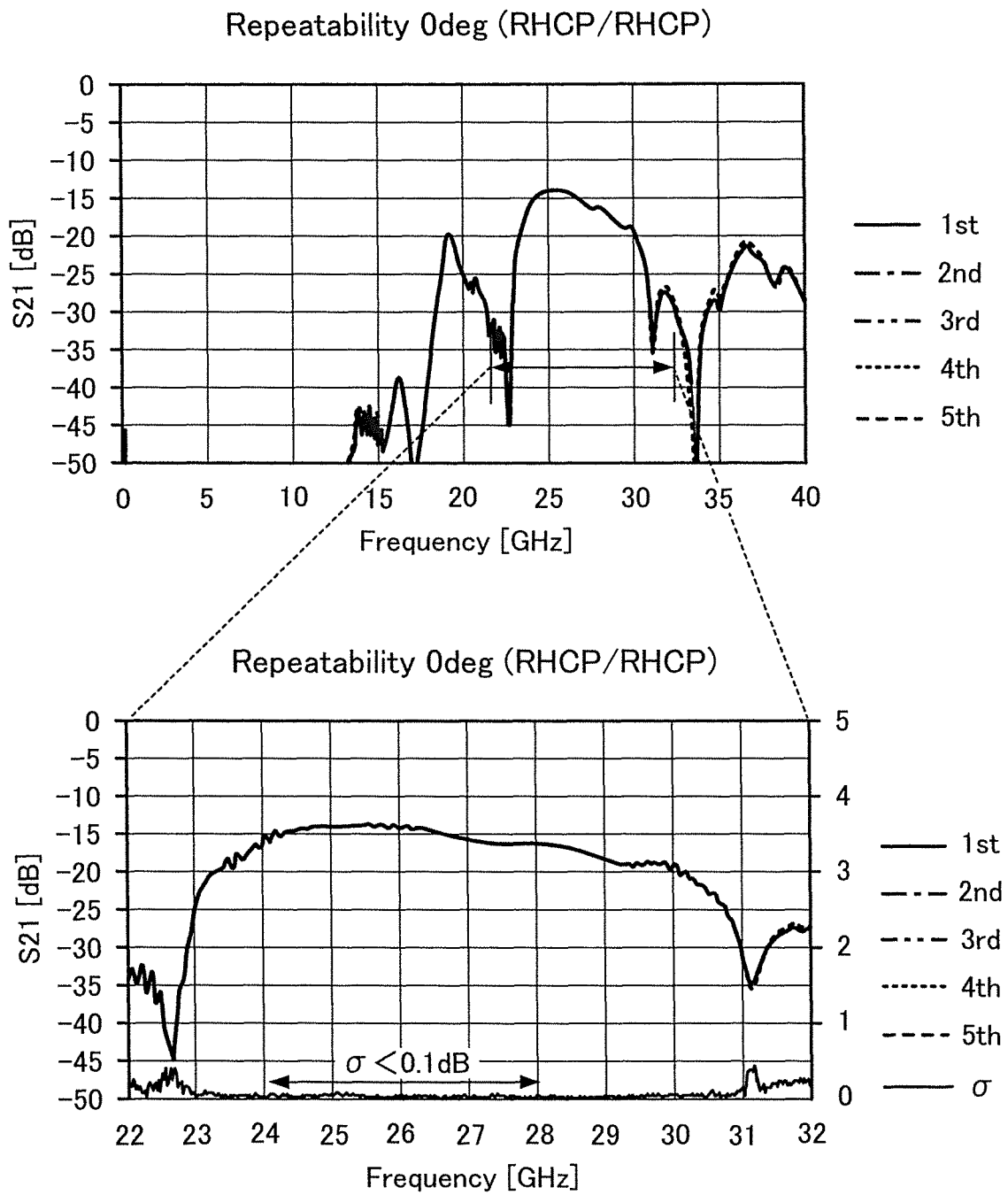
FIG. 16 is a graph showing $S_{21}$, measured with the configuration of FIG. 14A, of the circularly polarized antenna according to the first embodiment of the present invention.

As shown in FIG. 14A, in the state where the two circularly polarized antennas 20 whose main polarizations are RHCP are arranged such that extending directions of the feeding lines 28 are aligned, and the surfaces on which the antenna elements 23 are formed (that is, the opposite surfaces 21b of the dielectric substrates 21) face in parallel (hereinafter also referred to as "0° opposite state"), $S_{11}$ and $S_{21}$ were measured using a signal analyzer 70. FIGS. 15 and 16 show the results of the measurements.

Figure 14B:
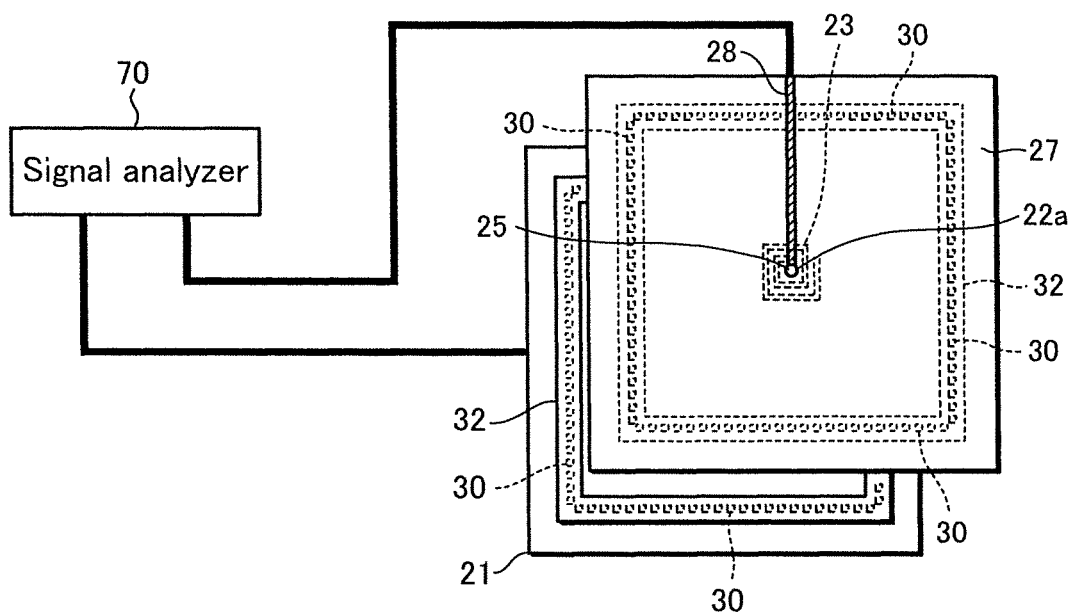
FIG. 14B is a schematic diagram showing another configuration for measuring $S_{11}$ and $S_{21}$ of the circularly polarized antenna according to the first embodiment of the present invention.
Figure 17:
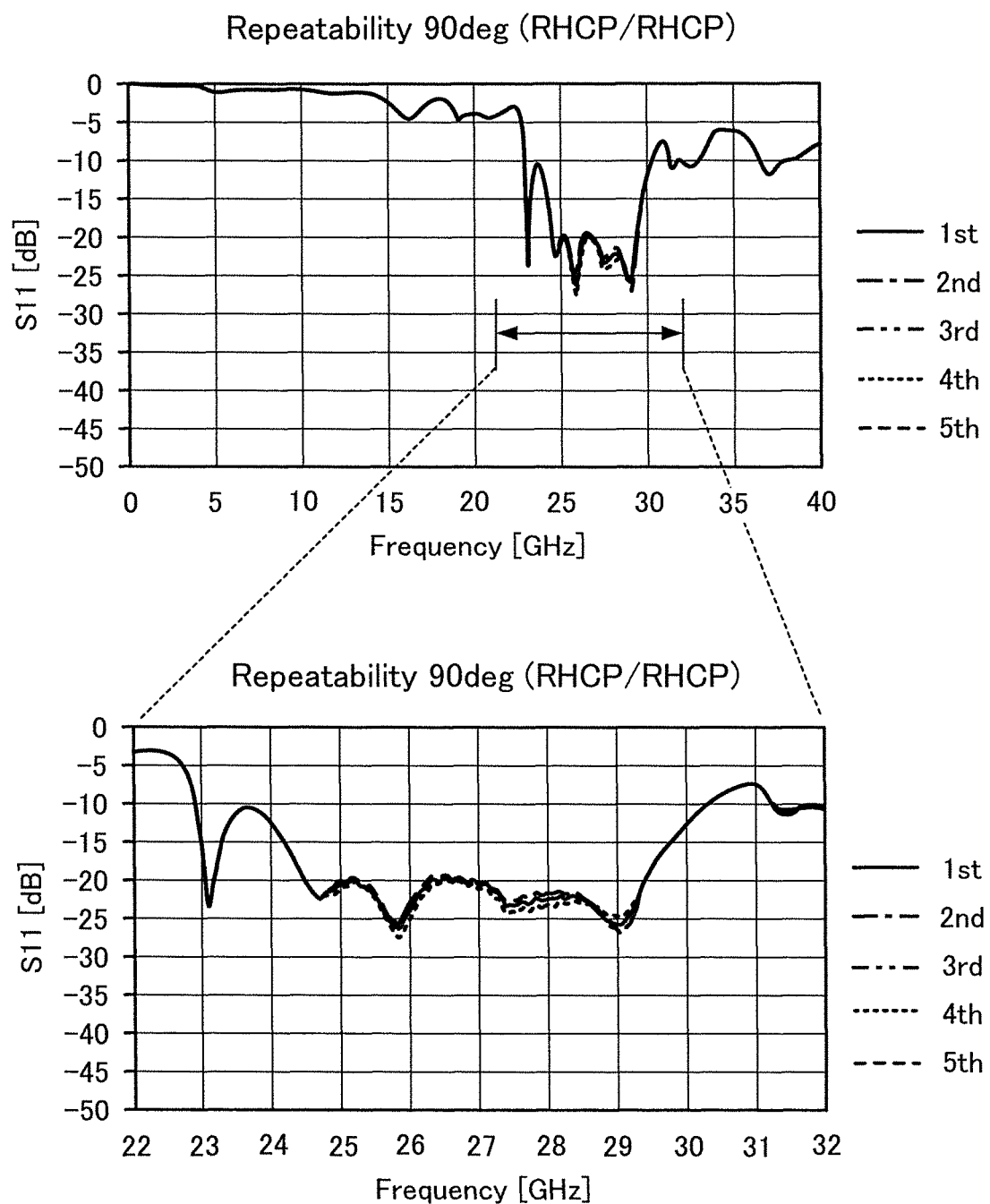
FIG. 17 is a graph showing $S_{11}$, measured with the configuration of FIG. 14B, of the circularly polarized antenna according to the first embodiment of the present invention.
Figure 18:
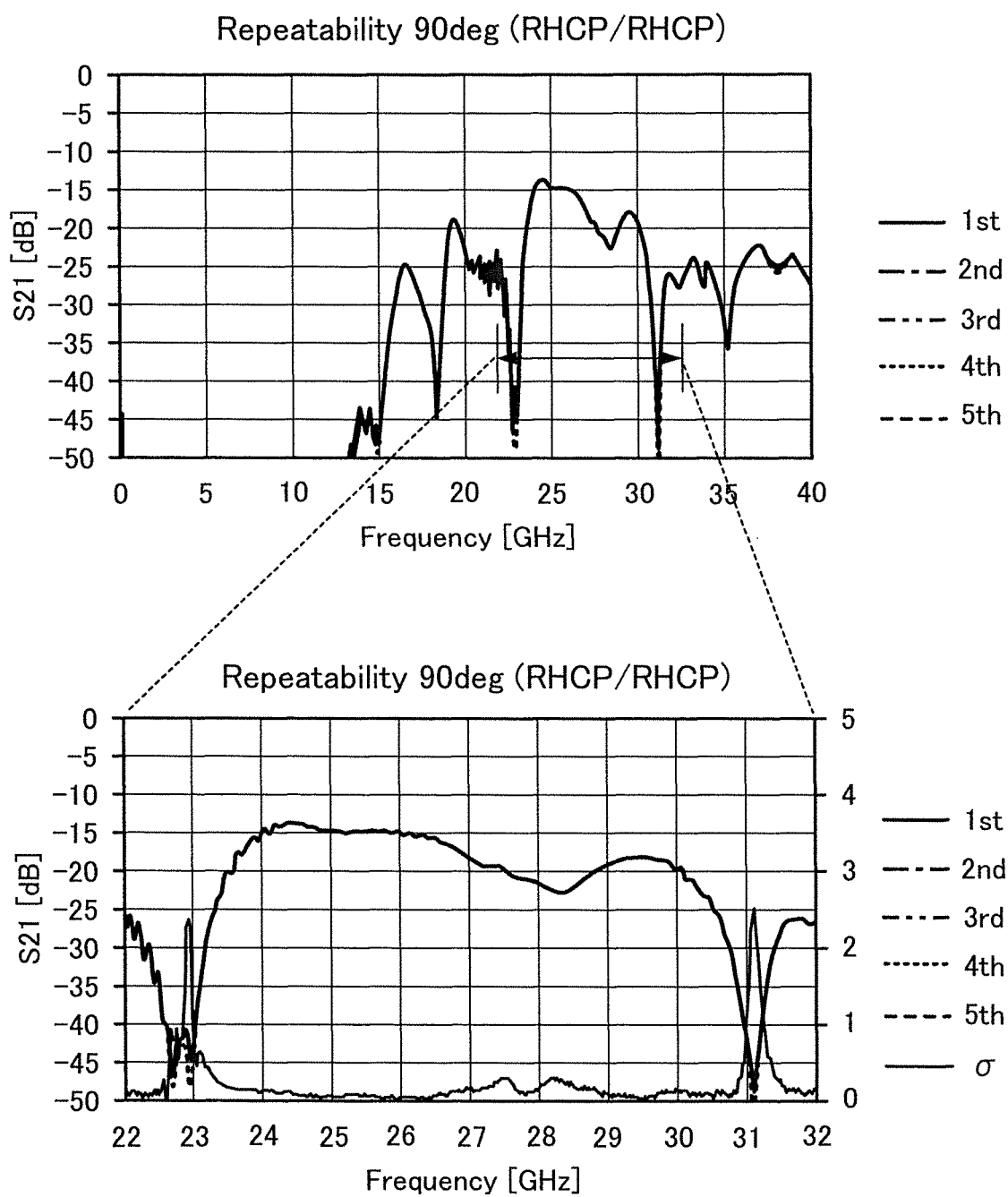
FIG. 18 is a graph showing $S_{21}$, measured with the configuration of FIG. 14B, of the circularly polarized antenna according to the first embodiment of the present invention.

As shown in FIG. 14B, in the state where the two circularly polarized antennas 20 whose main polarizations are RHCP are arranged such that extending directions of the feeding lines 28 are arranged at aright angle to each other, and the surfaces on which the antenna elements 23 are formed (that is, the opposite surfaces 21b of the dielectric substrates 21) face in parallel (hereinafter also referred to as "90° opposite state"), $S_{11}$ and $S_{21}$ were measured using the signal analyzer 70. FIGS. 17 and 18 show the results of the measurements.

Here, the signal analyzer 70 is, for example, constituted by a network analyzer or a signal analyzer with a tracking generator function. The measurements of $S_{11}$ and $S_{21}$ here were performed five times in total on the condition that a distance between the two circularly polarized antennas 20 was set to 2 cm. After each measurement, the two circularly polarized antennas 20 were spaced apart by a distance that could be regarded as infinite, and then the next round of measurement was performed.

From FIGS. 15 to 18, it is found that the frequency characteristics of $S_{11}$ and $S_{21}$ obtained by five-time measurements substantially overlap on the graphs, and thus the results of measurements with high repeatability were obtained for both $S_{11}$ and $S_{21}$. In the 90° opposite state in FIG. 18, a concavity or fall of $S_{21}$ around 28 GHz is seen. This is because multiple reflections are generated such that signal components in opposite phases cancel each other between the two circularly polarized antennas 20, thereby leading to appearance of an amplitude error.

FIGS. 19 and 20 are graphs showing results of measurements of $S_{21}$ when a distance between the two circularly polarized antennas 20 and an inclination angle θ were varied in the 0° opposite state. Here, the distance between the two circularly polarized antennas 20 is assumed to be a distance between the positions where central axes of the feed pins 25 intersect the opposite surfaces 21b of the dielectric substrates 21 of respective circularly polarized antenna 20.

Figure 19A:
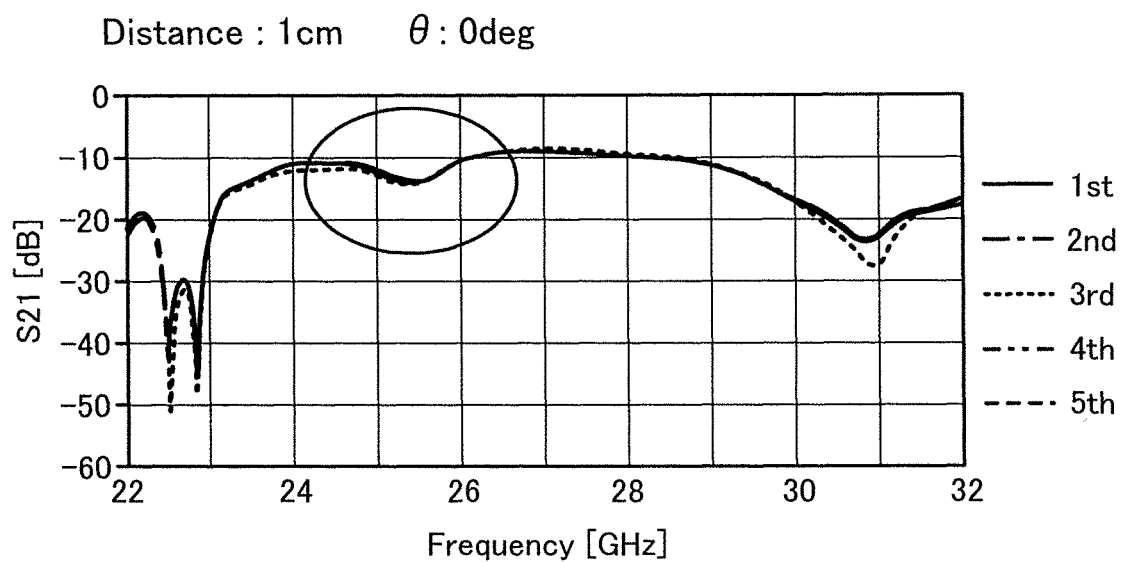
FIG. 19A is a graph showing $S_{21}$ in the case where the distance between two circularly polarized antennas in the first embodiment of the present invention is 1 cm and the inclination angle is 0°.

FIG. 19A shows results of measurements of $S_{21}$ when the distance between two circularly polarized antennas 20 is 1 cm and the inclination angle θ is 0°. As shown by an ellipse in FIG. 19A, a concavity due to an amplitude error is seen around 25.5 GHz.

Figure 19B:
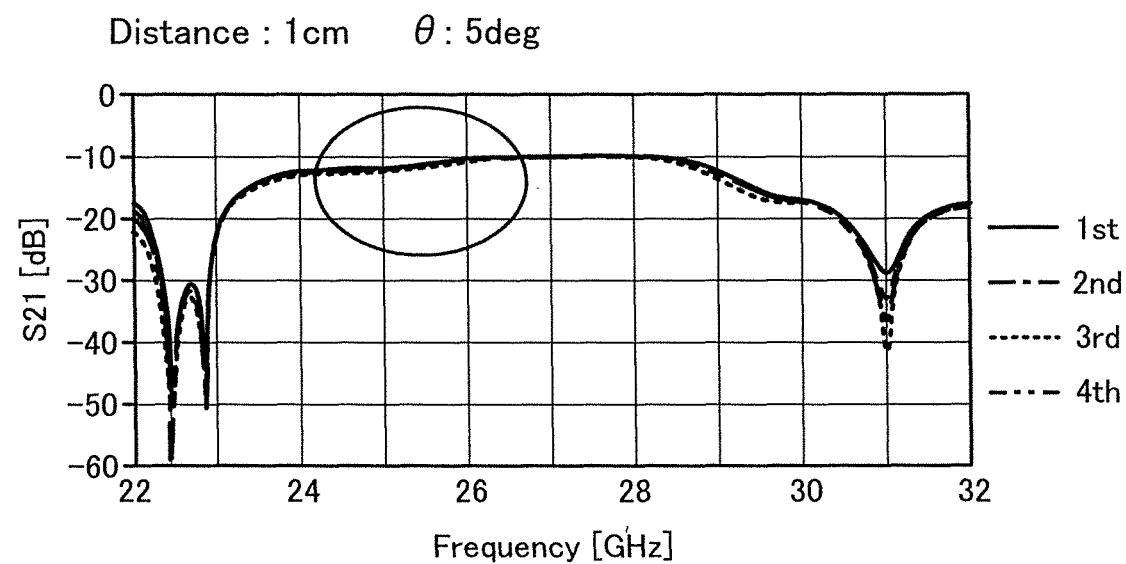
FIG. 19B is a graph showing $S_{21}$ in the case where the distance between two circularly polarized antennas in the first embodiment of the present invention is 1 cm and the inclination angle is 5°.

FIG. 19B shows results of measurements of $S_{21}$ when the distance between the two circularly polarized antennas 20 is 1 cm and the inclination angle θ is 5°. As shown by an ellipse in FIG. 19B, it can be seen that the concavity around 25.5 GHz observed in the case of θ=0° is greatly improved.

Figure 20A:
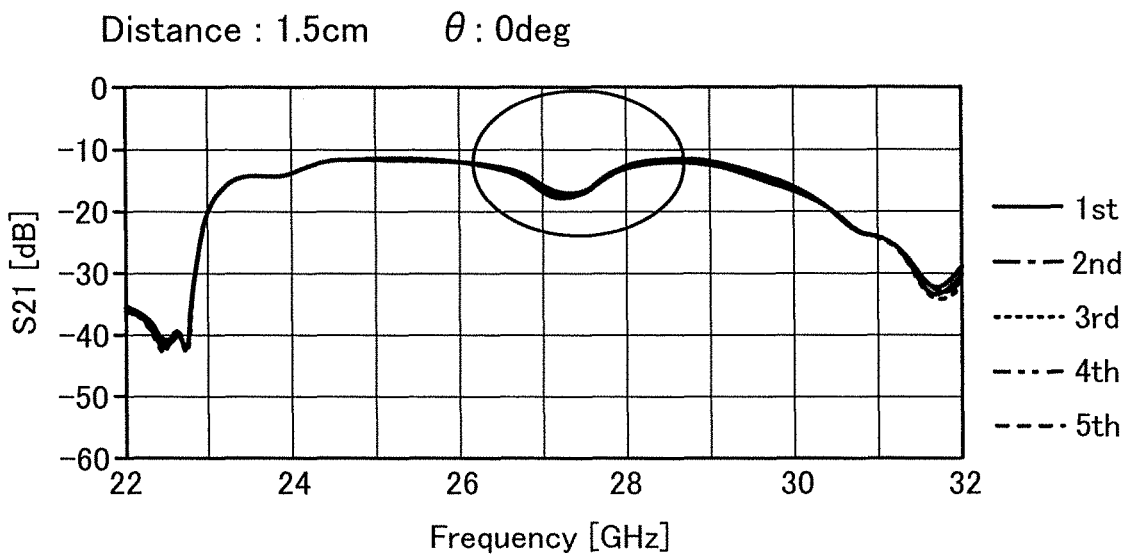
FIG. 20A is a graph showing $S_{21}$ in the case where the distance between two circularly polarized antennas in the first embodiment of the present invention is 1.5 cm and the inclination angle is 0°.

FIG. 20A shows results of measurements of $S_{21}$ when the distance between the two circularly polarized antennas 20 is 1.5 cm and the inclination angle θ is 0°. As shown by an ellipse in FIG. 20A, a concavity due to an amplitude error is seen around 27.3 GHz.

Figure 20B:
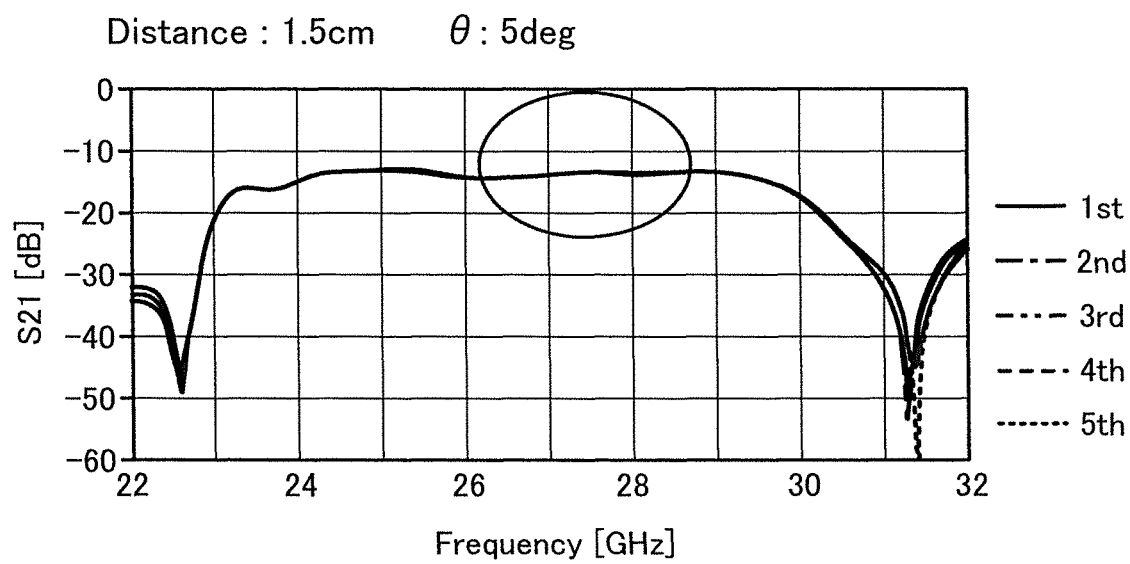
FIG. 20B is a graph showing $S_{21}$ in the case where the distance between two circularly polarized antennas in the first embodiment of the present invention is 1.5 cm and the inclination angle is 5°.

FIG. 20B shows results of measurements of $S_{21}$ when the distance between the two circularly polarized antennas 20 is 1.5 cm and the inclination angle θ is 5°. As shown by an ellipse in FIG. 20B, it can be seen that the concavity around 27.3 GHz observed in the case of θ=0° disappears.

Figure 21:
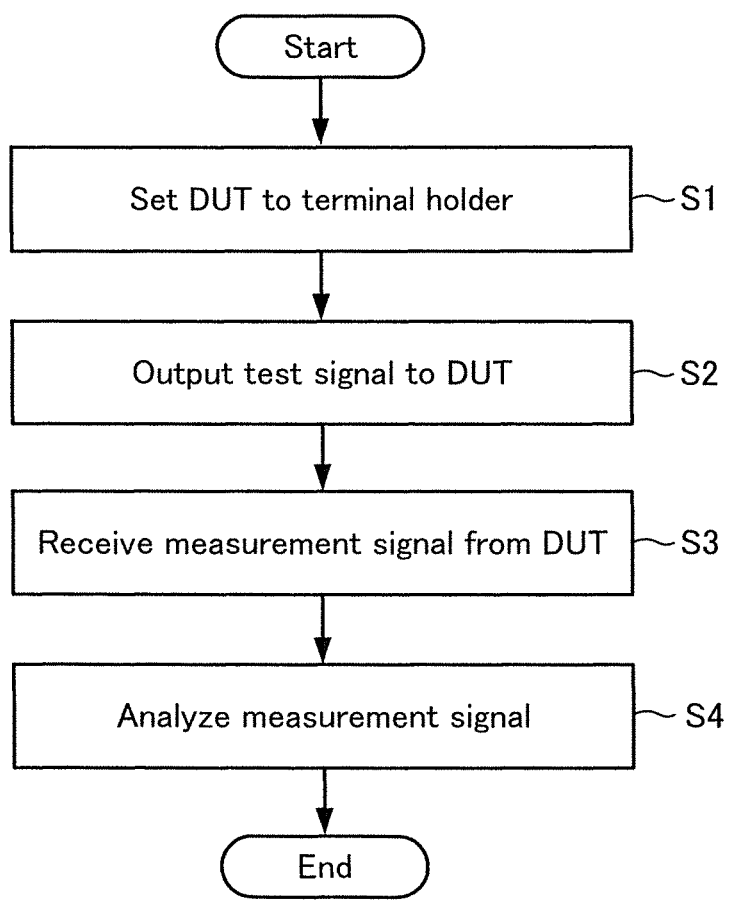
FIG. 21 is a flowchart for explaining a wireless terminal measurement method performed using the wireless terminal measurement apparatus according to the first embodiment of the present invention.

An example of a wireless terminal measurement method, which is performed using the wireless terminal measurement apparatus 1, according to the present embodiment will be described hereinafter with reference to the flowchart of FIG. 21.

First, a user sets the DUT 100 in the terminal holder 50 (step S1).

Next, the signal transmitter 61 of the measurement unit 51 outputs test signals to the circularly polarized antennas 20, thereby outputting the test signals to the DUT 100 via the circularly polarized antennas 20 and the antennas 110 of the DUT 100 (signal transmission Step S2).

Next, the signal receiver 62 of the measurement unit 51 receives by the circularly polarized antennas 20 measurement signals output from the DUT 100, to which the test signals were input, via the antennas 110 of the DUT 100 (signal reception step S3).

Next, the analyzer 63 of the measurement unit 51 performs analysis processing, which conforms to the communication standard applied to the DUT 100, on the measurement signal received in the signal reception step S3 (analysis processing step S4).

As described above, in the wireless terminal measurement apparatus 1 according to the present embodiment, the radiation direction of the measurement signal emitted from the radiation surface 110a of the antenna 110 is not parallel to the normal direction of the opposite surface 21b of the circularly polarized antenna 20. This configuration reduces multiple reflections of the measurement signal between the antenna 110 and the circularly polarized antenna 20. That is, the wireless terminal measurement apparatus 1 according to the present embodiment can perform accurate measurements on the DUT 100 by suppressing the amplitude error caused by the multiple reflections occurring between the antenna 110 and the circular polarized antenna 20.

In the wireless terminal measurement apparatus 1 according to the present embodiment, the radiation direction of the test signal radiated from the antenna element 23 of the circularly polarized antenna 20 is not parallel to the normal direction of the radiation plane of the antenna 110. This configuration can reduce the multiple reflections of the test signal between the antenna 110 and the circularly polarized antenna 20.

In the wireless terminal measurement apparatus 1 according to the present embodiment, since the opposite surface 21b of the circularly polarized antenna 20 is not parallel to the radiation surface of the antenna 110, it is possible to reduce the multiple reflections of the measurement signal and the test signal between the antenna 110 and the circularly polarized antenna 20.

The circularly polarized antenna 20 of the wireless terminal measurement apparatus 1 according to the present embodiment is provided with the metal posts 30 penetrating the dielectric substrate 21 and a frame-shaped conductor 32 extending a predetermined distance toward the antenna element 23. The metal posts 30 are arranged so as to surround the antenna element 23 to form a cavity structure. The frame-shaped conductor 32 short-circuits the tips of the metal post s30 along the array direction, and extends by a predetermined distance in the direction of the antenna element 23. With such configuration, the circularly polarized antenna 20 can suppress occurrence of a surface wave and thus a radiation characteristic of the antenna can be made to be a desired characteristic.

Since the wireless terminal measurement apparatus 1 according to the present embodiment uses the circularly polarized antenna 20, an accurate measurement can be performed irrespective of the direction of the linearly polarized wave of the measurement signal radiated from the antenna 110.

Since the wireless terminal measurement apparatus 1 according to the present embodiment performs measurements in a near field, it is possible to perform an accurate measurement without using an anechoic chamber.

Second Embodiment

A wireless terminal measurement apparatus 2 according to a second embodiment of the present invention will be described hereinafter with reference to the drawings. Note that the same reference numerals are given to the same configurations as those of the first embodiment, and the description thereof will be omitted. Further, the description of operations similar to those in the first embodiment will also be omitted.

Figure 22:
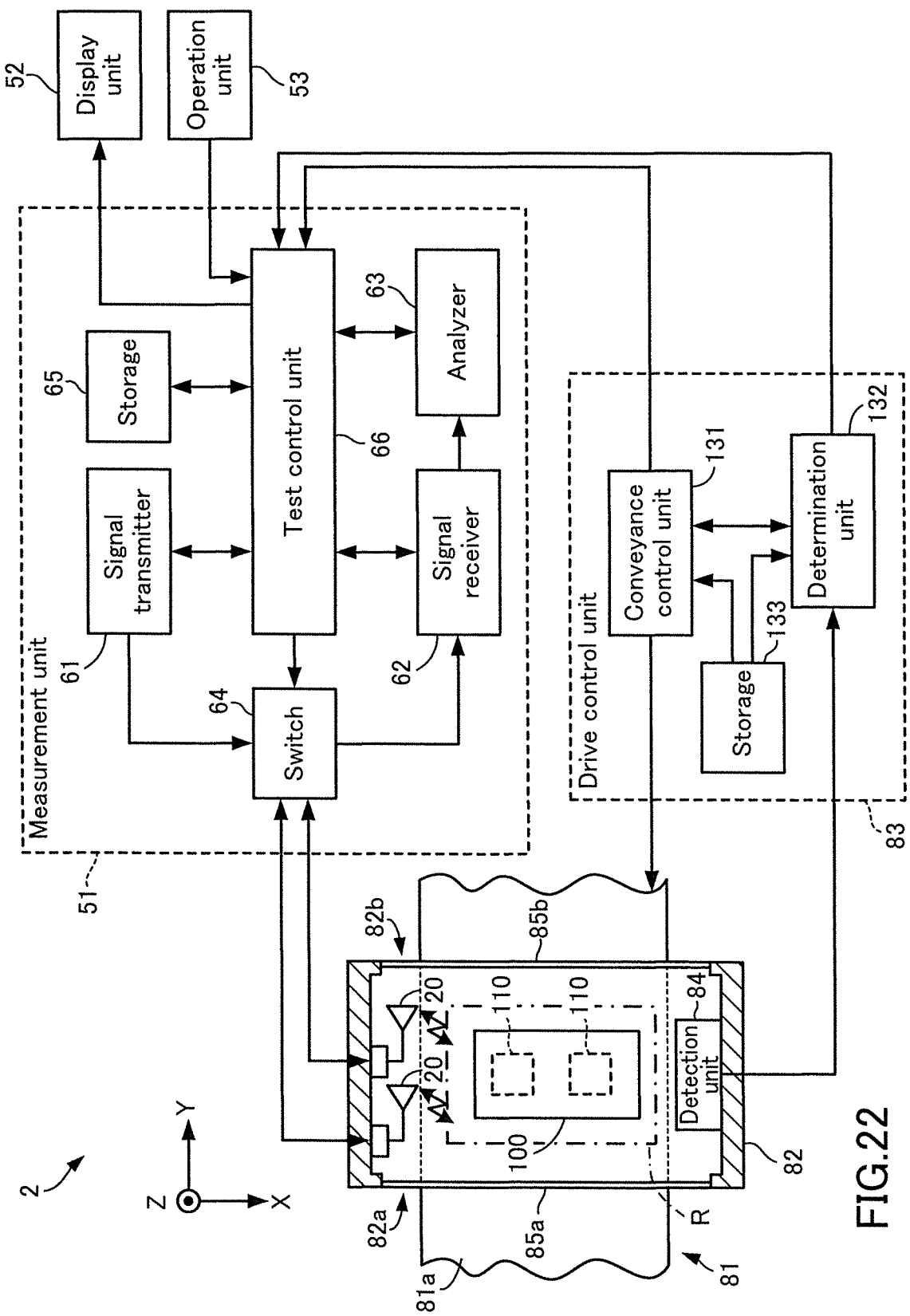
FIG. 22 is a block diagram showing the configuration of a wireless terminal measurement apparatus according to a second embodiment of the present invention.

As shown in FIG. 22, the wireless terminal measurement apparatus 2 of the present embodiment includes a belt conveyor 81, an electromagnetic wave shield box 82 as a measurement box, a drive control unit 83, a measurement unit 51, a display unit 52, and an operation unit 53.

The electromagnetic wave shield box 82 hits an entrance 82a and an exit 82b for conveying the DUT 100, and covers a space including at least a part of a conveying path 81a. The electromagnetic wave shield box 82 internally included one or more circularly polarized antennas 20 to be spatially coupled to the antenna 110 of the DUT 100, and a detection unit 84.

The circular polarized antennas 20 are disposed in the electromagnetic wave shield box 82 such that the opposite surfaces 21b are inclined by an inclination angle θ with respect to the radiation surfaces 110a of the antennas 110 of the DUT 100 when the entire DUT 100 is conveyed to a communicable region R described later.

The electromagnetic wave shield box 82 is provided above the conveying path 81a, and includes electromagnetic wave absorbers 85a, 85b including electromagnetic wave absorbing materials for preventing electromagnetic waves generated by the antennas 110 of the DUT 100 and/or the circularly polarized antennas 20 from leaking, from the entrance 82a and/or the exit 82b.

The detection unit 84 has, for example, a light source for emitting a light beam and a light receiver for receiving the light beam emitted from the light source. That is, the detection unit 48 has a so-called light emitting and receiving unit configured to detect that the light receiver cannot receive the light beam while the light source is emitting the light beam. With this configuration, the detection unit 84 can detect an entry of the DUT 100 into the electromagnetic wave shield box 82. Further, when the detection unit 84 detects the DUT 100, the detection unit 84 outputs a detection signal, which indicates the detection of the DUT 100, to the determination unit 132 of the drive control unit 83 described later.

The drive control unit 83 is configured by, for example, a microcomputer, a personal computer, or the like including a CPU, a ROM, a RAM, an HDD and the like. The ROM, RAM, and HDD constitute the storage 133. The conveyance control unit 131 and the determination unit 132 are configured in software by executing a predetermined program stored in advance in the storage 133.

The conveyance control unit 131 drives and controls the belt conveyor 81, and can change a conveying speed in accordance with a control signal output from the determination unit 132. The conveying speed may be constant at all times.

The storage 133 stores information on the size of the DUT 100, information on the communicable area R with the DUT 100, and the like. Here, the communicable region R is a region where the antenna 110 of the DUT 100 and the circularly polarized antenna 20 can be spatially coupled with sufficient strength, and electromagnetic wave absorbers 85a and 85b described later can maintain a closed state of the area.

The determination unit 132 determines whether or not the entire DUT 100 has been conveyed to the communicable region R in the electromagnetic wave shield box 82 based on a detection signal output from the detection unit 84, information on the conveyance speed of the OUT 100 output from the conveyance control unit 131, and information on the DUT 100 stored in the storage 133. For example, the determination unit 132 can perform the above determination by calculating the time required from when the detection signal is output from the detection unit 84 until the entire DUT 100 goes into the communicable area R, and the time required from when the detection signal is output from the detection unit 84 until at least a part of the DUT 100 goes out of the communicable area R.

Further, as described above, the determination unit 132 may output to the conveyance control unit 131 a control signal for changing the conveyance speed. For example, when the entire DUT 100 is conveyed to the communicable area R, the determination unit 132 may output a control signal for making a conveyance speed of the belt conveyor 81 slower than a conveyance speed in the case that the entire DUT 100 is not conveyed to the communicable area R in the electromagnetic wave shield box 82.

Alternatively, when the entire DUT 100 is conveyed to the communicable region R in the electromagnetic wave shield box 82, the determination unit 132 may output a control signal for stopping the conveyance by the belt conveyor 81 for a predetermined time to set the conveyance speed to zero for a predetermined time.

It is noted that the detection unit 84 described above may be configured by an imaging device. In this case, the determination unit 132 may determine by image processing whether or not the entire DUT 100 is conveyed to the communicable area R in the electromagnetic wave shield box 82.

On the condition that the determination unit 132 of the drive control unit 83 determines that the entire DUT 100 has been conveyed to the communicable area R in the electromagnetic wave shield box 82, the signal transmitter 61 transmits a test signal to the circularly polarized antennas 20, thereby outputting the test signal to the DUT 100, carried by the belt conveyor 81, via the circular polarized antennas 20 and the antennas 110 of the DUT 100.

On the condition that the determination unit 132 of the drive control unit 83 determines that the entire DUT 100 has been conveyed to the communicable area R in the electromagnetic shield box 82, the signal receiver 62 receives, by the circularly polarized antennas 20 via the antennas 110 of the DUT 100, a measurement signal output from the DUT 100 into which the test signal was input.

By controlling as described above the signal transmitter 61 and the signal receiver 62, a performance test can be completed within the time during which the DUT 100 is housed in the electromagnetic wave shield box 82.

Figure 23:
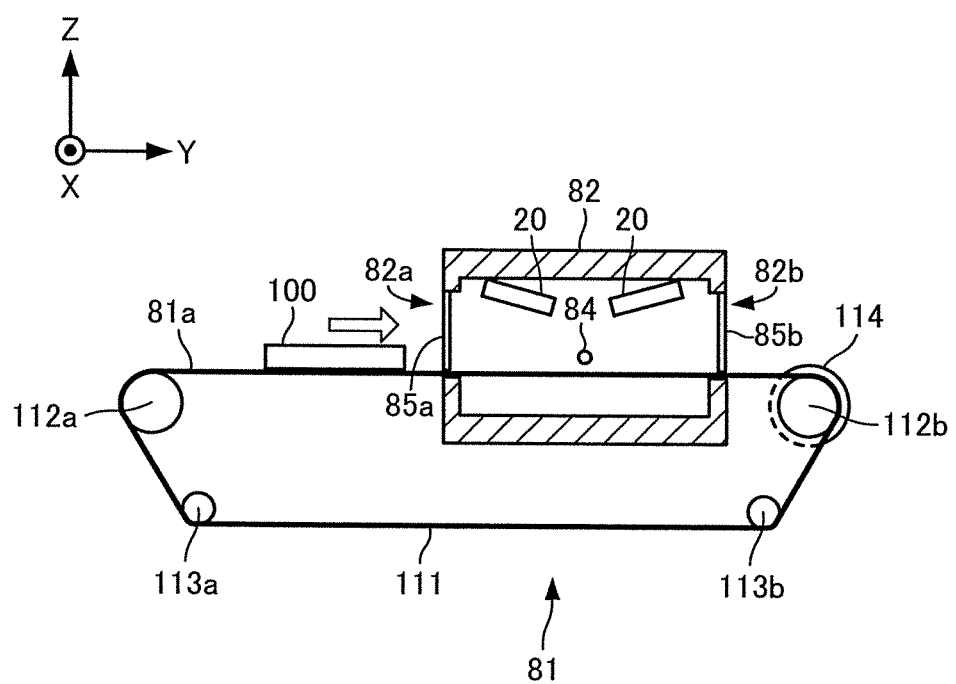
FIG. 23 is a cross-sectional view, taken along a conveying direction, of a belt conveyor and an electromagnetic wave shield box provided in the wireless terminal measurement apparatus according to the second embodiment of the present invention.

FIG. 23 is a cross-sectional view of the belt conveyor 81 and the electromagnetic wave shield box 82 taken along a conveyance direction (Y direction) of the DUT 100. The belt conveyor 81 has, for example, an endless belt 111 wound around a plurality of pairs of conveying rollers 112a, 112b, 113a, 113b, and conveys the DUT 100 from the entrance 82a side to the exit 82b side of the electromagnetic wave shield box 82 in the conveying path 81a of an upper run of the belt 111.

Further, the belt conveyor 81 is provided with a motor 114 for rotating the belt 111, at one axial end of the conveying roller 112b. The motor 114 is driven and controlled by a conveyance control unit 131.

Figure 24:
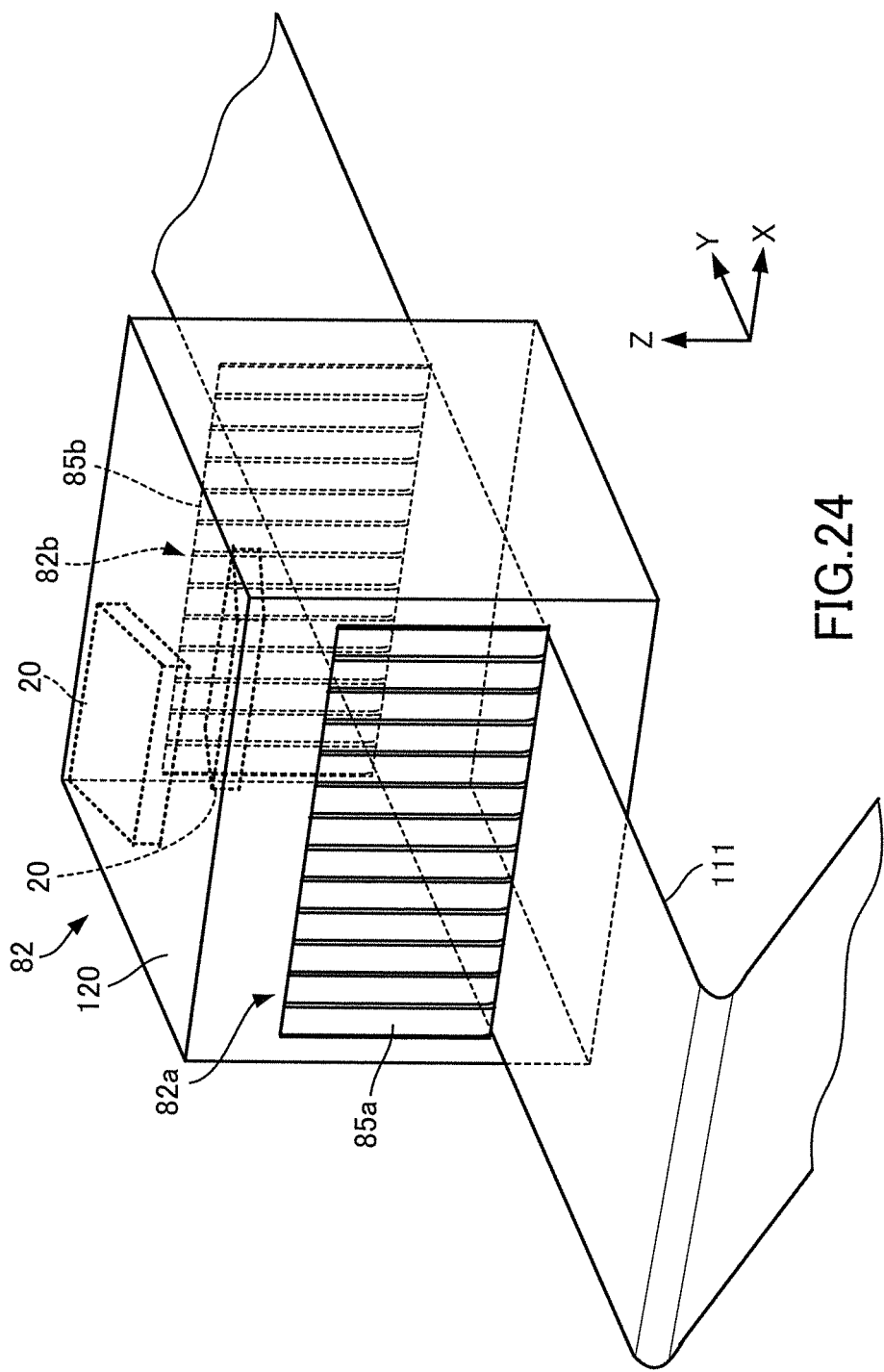
FIG. 24 is a perspective view showing an example of the configuration of electromagnetic wave absorbers provided in the electromagnetic wave shield box according to the second embodiment of the present invention.
Figure 25:
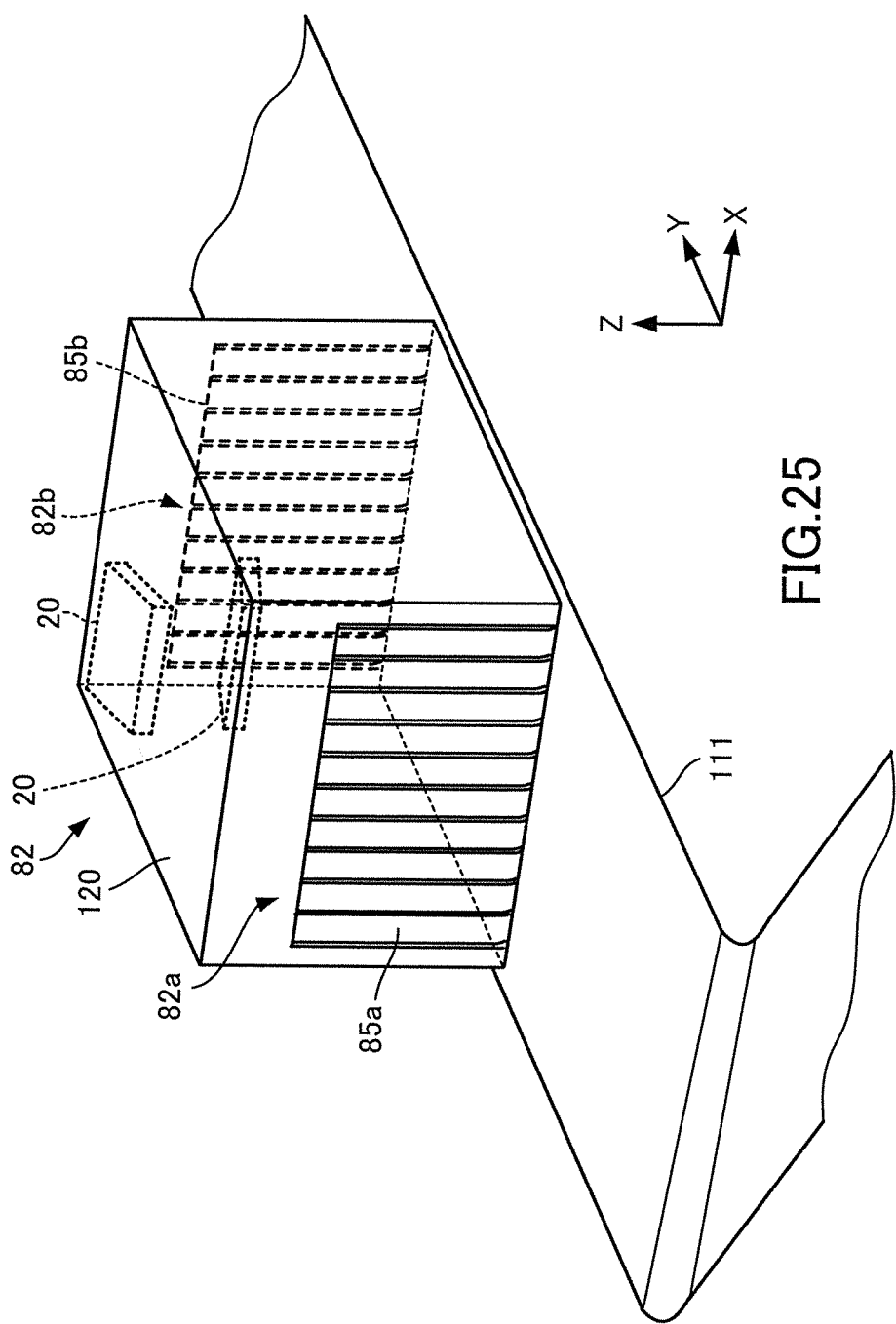
FIG. 25 is a perspective view showing another example of the configuration of electromagnetic wave absorbers provided in the electromagnetic wave shield box according to the second embodiment of the present invention.

FIGS. 24 and 25 are perspective views showing examples of arrangement of the electromagnetic wave absorbers 85a and 85b in the electromagnetic wave shield box 82. FIG. 24 shows the configuration in which the belt 111 passes through the entrance 82a and the exit 82b of the electromagnetic wave shield box 82 in the conveyance direction. On the other hand, FIG. 25 shows another configuration in which the electromagnetic wave shield box 82 has an opening at the bottom thereof, and the belt 111 passes through the opening in the conveyance direction such that the belt 111 always covers the opening.

Here, a housing 120 of the electromagnetic wave shield box 82 is made of a conductive metal such as iron, stainless steel, aluminum, copper, brass, and alloy thereof, so that the housing 120 has an electromagnetic wave shielding function. The electromagnetic wave shield box 82 can be manufactured by processing, for example, bending of a metal plate made of any one of these materials. Holes may be punched in the metal plate for weight reduction and resource saving. Alternatively, a reticulated material may be used instead of a plate. If the size of the hole or mesh, is sufficiently smaller than the wavelength of the radio wave of the measurement signal output from the DUT 100 (for example, 1/10 wavelength or less), the shielding performance as the electromagnetic wave shield box can be maintained.

The belt 111 is preferably a conductive belt formed by mixing an electrically conductive material or metal particles with cloth or rubber. Further, for example, the belt 111 may be made by processing a sheet made of iron, stainless steel, aluminum, copper, brass or alloy thereof to obtain a structure ensuring elasticity usable for the conveyor. Alternatively, the belt 111 may be formed such that a net-like structure of the above metal is piled up on cloth or rubber used for the conveyor.

In the configuration of FIG. 24, as long as shielding is sufficiently ensured by the electromagnetic wave shield box 82 and the conductive electromagnetic wave absorbers 85a and 85b, the belt 111 is not necessarily made of metal. In contrast in the configuration shown in FIG. 25, it is necessary that the conductive belt 111 and the electromagnetic wave shield box 82 are in good conductive contact with each other via a conductive slider or the like.

When the DUT 100 passes through the entrance 82a or the exit 82b of the electromagnetic wave shield box 82, the electromagnetic wave absorbers 85a and 85b open the entrance 82a or the exit 82b, and when the entire DUT 100 is conveyed into the electromagnetic wave shield box 82, the electromagnetic wave absorbers 85a and 85b close the entrance 82a and the exit 82b

As shown in FIGS. 24 and 25, the electromagnetic wave absorbers 85a and 85b are configured by an electromagnetic wave shielding member which is formed into a plurality of rectangular shapes in a horizontal direction (X direction) orthogonal to a conveyance direction (Y direction) in which the belt conveyor 81 conveys the DUT 100. The electromagnetic wave shielding member is made of, for example, a cloth or rubber in which a conductive substance or metal particles are mixed, or a sheet made of iron, stainless steel, aluminum, copper, brass or alloy thereof. The electromagnetic wave absorbers 85a and 85b configured as described above are suspended in the housing 120 so as to close the entrance 82a and the exit 82b of the housing 120.

Figure 26:
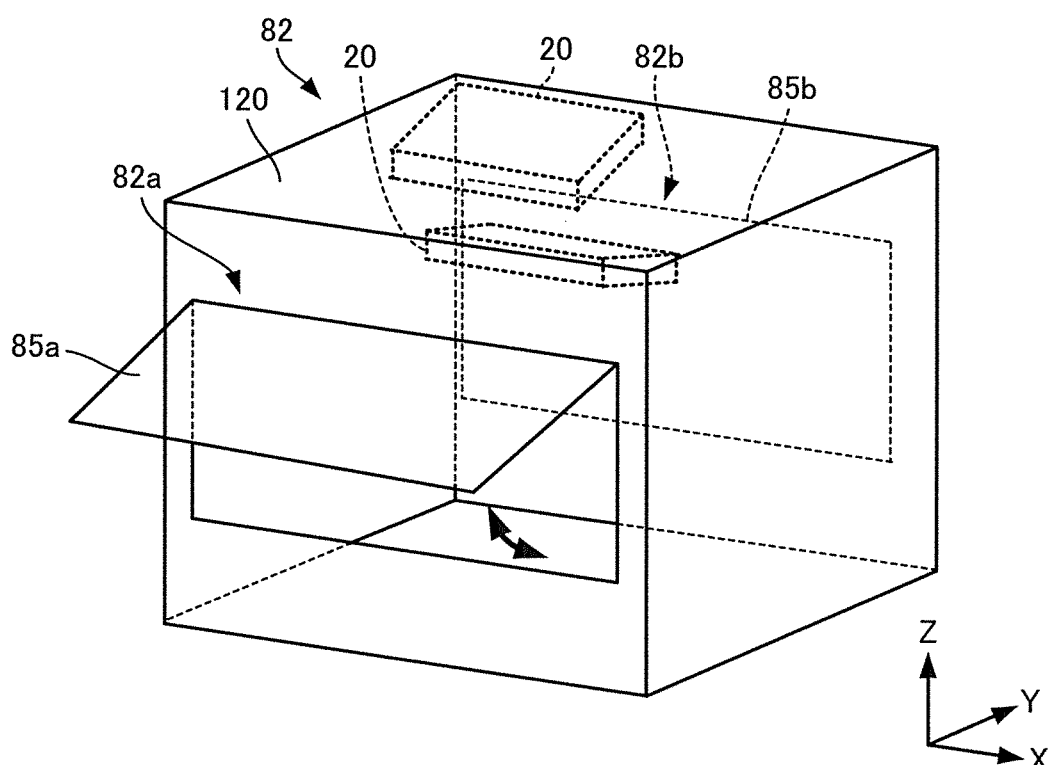
FIG. 26 is a perspective view showing an example of the configuration in the case where metal plates are used as the electromagnetic wave absorbers of the electromagnetic wave shield box according to the second embodiment of the present invention.
Figure 27:
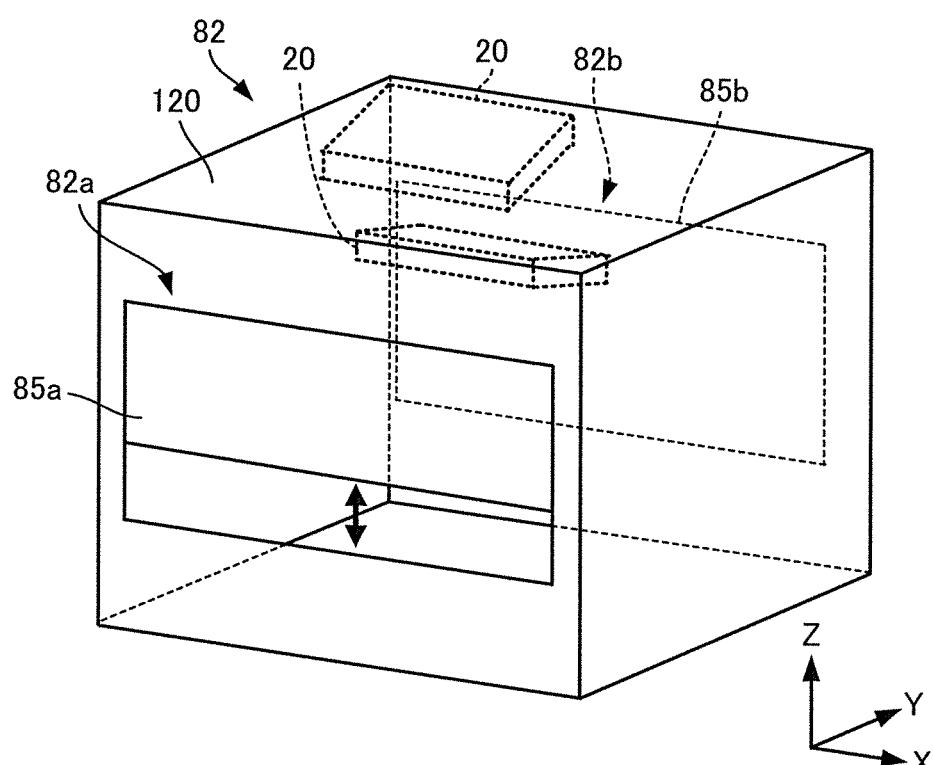
FIG. 27 is a perspective view showing another example of the configuration in the case where metal plates are used as the electromagnetic wave absorbers of the electromagnetic wave shield box according to the second embodiment of the present invention.

As shown in FIGS. 26 and 27, other examples of the electromagnetic wave absorbers 85a and 85b include a metal plate (FIG. 26) capable of swinging about the horizontal direction (X direction) orthogonal to the conveyance direction (Y direction) and a metal plate (FIG. 27) capable of sliding in a vertical direction (Z direction) orthogonal to the conveyance direction (Y direction). These metal plates are driven by any driving device based on detection information of the DUT 100 output from any detecting means.

It is noted that the positions and the number of the circularly polarized antennas 20 in the electromagnetic wave shield box 82 are not limited to the examples shown in FIGS. 22 to 27. For example, it is also possible to continuously provide a plurality of sections in the conveyance direction of the DUT 100 in the electromagnetic wave shield box 82, and to arrange one or more circularly polarized antennas 20 in each section.

Figure 28:
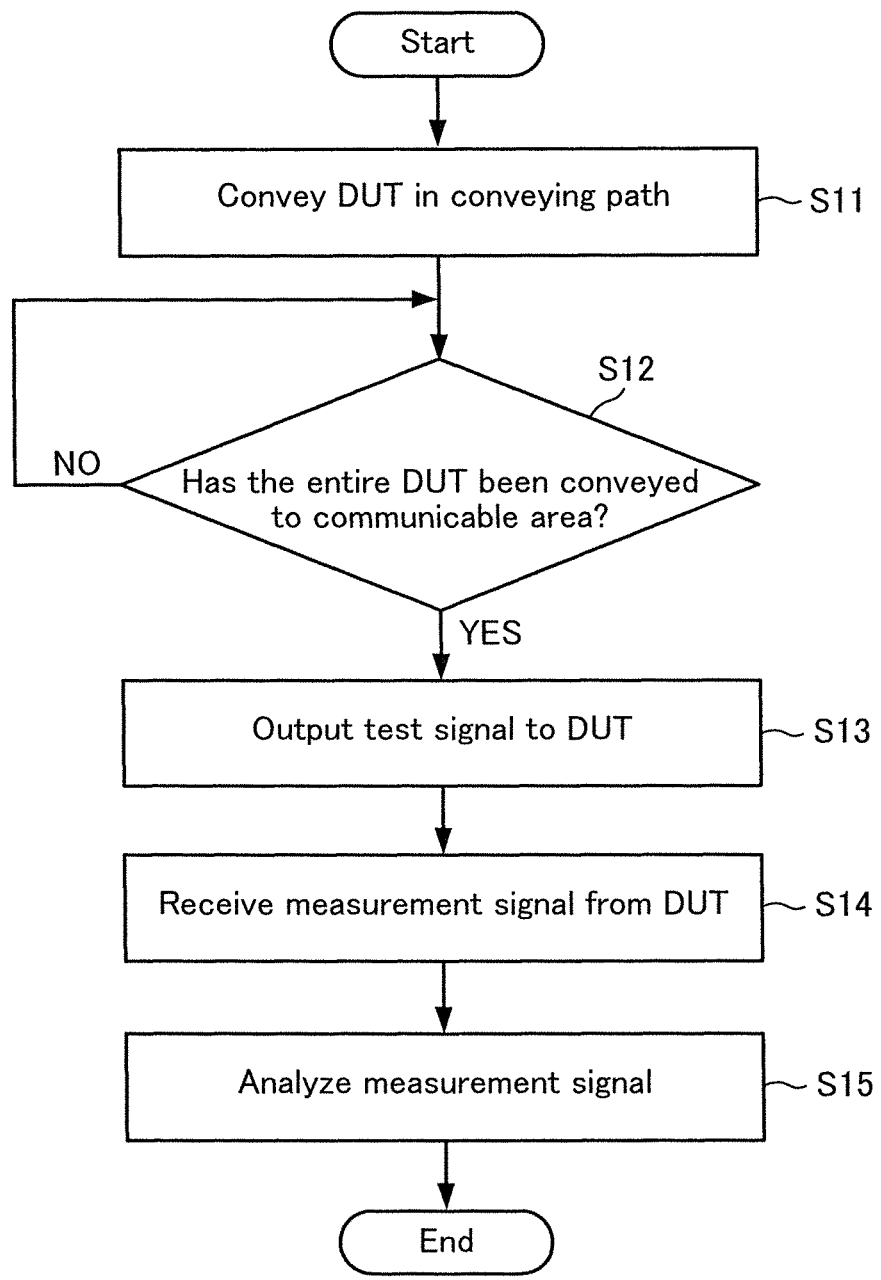
FIG. 28 is a flowchart for explaining a wireless terminal measurement method performed using the wireless terminal measurement apparatus according to the second embodiment of the present invention.

An example of the process of the wireless terminal measurement method using the wireless terminal measurement apparatus 2 according to the present embodiment will be described hereinafter with reference to the flowchart of FIG. 28.

First, the conveyance control unit 131 of the drive control unit 83 conveys the DUT 100 in the conveying path 81a (conveyance step S11).

Figure 29A:
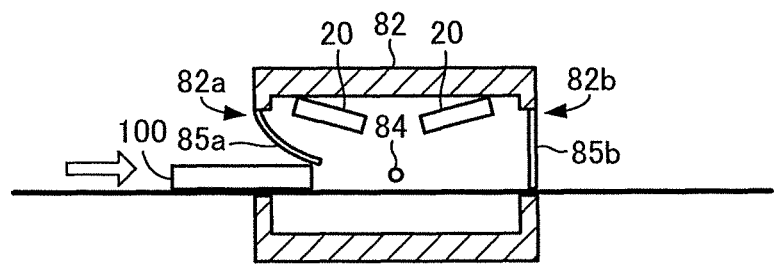
FIGS. 29A, 29B and 29C are cross-sectional views for explaining the wireless terminal measurement method performed using the wireless terminal measurement apparatus according to the second embodiment of the present invention.

Next, the determination unit 132 of the drive control unit 83 determines whether or not the entire DUT 100 has been conveyed to the communicable area R in the electromagnetic wave shield box 82 (determination step S12). As shown in FIG. 29A, when the DUT 100 is passing through the entrance 82*a* of the electromagnetic wave shield box 82, the detection unit 84 cannot detect the DUT 100 and the determination unit 132 determines that the entire DUT 100 has not been conveyed to the communicable region R in the electromagnetic wave shield box 82.

Figure 29B:
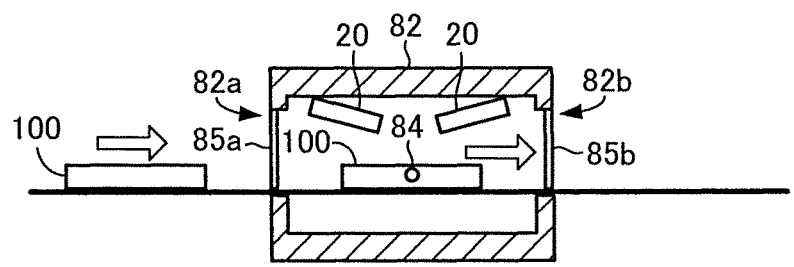

On the other hand, as shown in FIG. 29B, when the entire DUT 100 passes through the entrance 82*a* of the electromagnetic wave shield box 82 and the electromagnetic wave absorbers 85*a* and 85*b* are closed, the determination unit 132 determines that the entire DUT 100 has been conveyed to the communicable region R in the electromagnetic wave shield box 82, based on a detection signal output from the detection unit 84, information on the conveyance speed of the DUT 100 output from the conveyance control unit 131, and information on the DUT 100 stored in the storage 133 of the drive control unit 83.

Next, on the condition that it is determined that the entire DUT 100 has been conveyed to the communicable area R in the determination step S12, the signal transmitter 61 of the measurement unit 51 outputs a test signal to the circularly polarized antennas 20, thereby outputting the test signal to the DUT 100, carried by the belt conveyor 81, via the circularly polarized antennas 20 and the antennas 110 of the DUT 100 (signal transmission step S13).

Next, on the condition that it is determined that the entire DUT 100 has been conveyed to the communicable area R in the determination step S12, the signal receiver 62 of the measurement unit 51 receives a measurement signal output from the DUT 100, into which the test signal was input, by the circularly polarized antennas 20 via the antennas 110 of the DUT 100 (signal reception step S14).

Next, the analyzer 63 of the measurement unit 51 performs analysis processing in accordance with the communication standard of the DUT 100 with respect to the measurement signal received in the signal reception step S14 (analysis processing step S15).

That is, only when the electromagnetic wave absorbers 85*a*, 85*b* are closed and the entire DUT 100 has been conveyed to the communicable area R, transmission and reception of signals are carried out between the circularly polarized antennas 20 and the antennas 110 of the DUT 100.

Figure 29C:
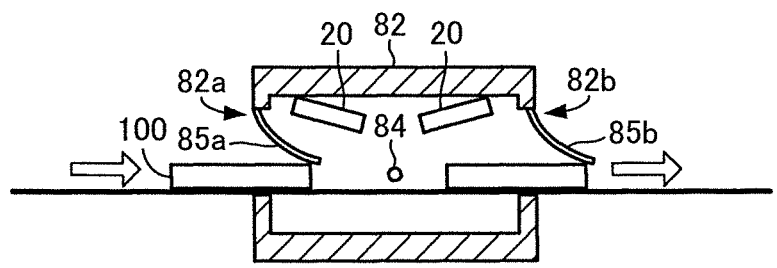

As shown in FIG. 29C, when the DUT 100 is passing through the exit 82*b* of the electromagnetic wave shield box 82 and the electromagnetic wave absorber 85*b* at the side of the exit 82*b* is open, the determination unit 132 determines that the DUT 100 has not been conveyed to the communicable area R in the electromagnetic wave shield box 82, based on the above-described detection signal, the information on the conveyance speed of the DUT 100, and the information on the DUT 100. It is desirable from a viewpoint of measurement efficiency that, simultaneously with the above passing through of the DUT 100, another DUT 100 is passing through the entrance 82*a* of the electromagnetic wave shield box 82.

As described above, the wireless terminal measurement apparatus 2 according to the present embodiment automatically determines that the entire DUT 100 has been conveyed to a predetermined area in the electromagnetic wave shield box 82, and then starts a performance test on the DUT 100. Therefore, it is possible to conduct the performance test on various wireless terminals and greatly shorten the test time.

Further, in the wireless terminal measurement apparatus 2 according to the present embodiment, it is unnecessary to connect the DUT 100 and the measurement apparatus with cables, and it is unnecessary to manually set and remove the DUT 100 in and from the electromagnetic wave shield box 82, so that the test time of the DUT 100 can be greatly shortened.

Further, since the wireless terminal measurement apparatus 2 according to the present embodiment does not need a dedicated jig for cable connection, it is possible to share the measurement apparatus in a factory that manufactures various types of wireless device, so that the test cost can be reduced.

It is noted that the scope of the present invention also includes the configuration that the measurement unit 51 and the belt conveyor 81 in the present embodiment can operate as an independent measurement device and an independent conveying device, respectively, and these devices are controlled by an external control device including the function of the drive control unit 83.

In the wireless terminal measurement apparatus 2 according to the present embodiment, even when a measurement box not having an electromagnetic wave shielding function is used instead of the electromagnetic wave shield box 82, the measurement performed with close arrangement of the antennas 110 of the DUT 100 and the circularly polarized antennas 20 efficiently prevents leakage of electromagnetic waves. The wireless terminal measurement apparatus 2 according to the present embodiment can further obtain the effect of shielding electromagnetic waves by virtue of the electromagnetic wave shield box 82 and the electromagnetic wave absorbers 85*a* and 85*b*.

What is claimed is:

1. A circularly polarized antenna device which is connectable to a wireless terminal measurement apparatus for performing measurements on a device under test (DUT) provided with an off-center antenna located towards one surface of the DUT, the circularly polarized antenna device comprising:
   a circularly polarized antenna comprising a dielectric substrate and a circularly polarized type of antenna element formed on a first surface of the dielectric substrate, the first surface being opposite to the one surface of the DUT, the circularly polarized antenna being spatially coupled to the antenna of the DUT; and
   a holder for securing the circularly polarized antenna and the DUT wherein the antenna of the DUT and the first surface of the dielectric substrate are not parallel to each other.

2. The circularly polarized antenna device according to claim 1, wherein the circularly polarized antenna comprises
   a ground conductor which is piled up at a second surface side of the dielectric substrate, the second surface being an opposite surface of the first surface of the dielectric substrate,
   a plurality of metal posts which are arranged at predetermined intervals so as to form a cavity, the metal posts surrounding the antenna element which is disposed in the cavity, wherein each of the metal posts has one and opposite ends, and penetrates the dielectric substrate along a thickness direction thereof, the one ends of the metal posts being connected to the ground conductor, and the opposite ends of the metal posts being arranged around the antenna element on the first surface of the dielectric substrate, and
   a frame-shaped conductor comprising a conducting rim which is disposed at the first surface side of the dielectric substrate and has a predetermined width in a direction of the antenna element, the conducting rim being extended along an arrangement of the opposite ends of the metal posts to define the cavity, and the conducting rim being connected to the opposite ends of the metal posts to short-circuit the metal posts, wherein the cavity and the frame-shaped conductor form a resonator, structural parameters of the resonator and the antenna element having been adjusted to set a resonant frequency of the resonator to a desired value, the structural parameters including at least one of an inside dimension $L_W$ of the given cavity, a rim width $L_R$ of the conducting rim, a number of turns of the antenna element, a basic length a0 of the antenna element, and an element width W of the antenna element, the rim width $L_R$ of the conducting rim being approximately ¼ of a wavelength of a surface wave propagating along the first surface of the dielectric substrate.

3. The circularly polarized antenna device according to claim 1, wherein a normal line of a radiation surface of the antenna of the DUT and a normal line of the one surface of the DUT are parallel to each other, and wherein a radiating direction of the antenna of the DUT is equal to a normal direction of the radiation surface of the antenna of the DUT.

4. The circularly polarized antenna device according to claim 2, wherein a normal line of a radiation surface of the antenna of the DUT and a normal line of the one surface of the DUT are parallel to each other, and wherein a radiating direction of the antenna of the DUT is equal to a normal direction of the radiation surface of the antenna of the DUT.

5. The circularly polarized antenna device according to claim 1, wherein a normal line of the first surface of the dielectric substrate of the circularly polarized antenna and a normal line of a radiation surface of the circularly polarized antenna are parallel to each other, and wherein a radiating direction of the circularly polarized antenna is equal to a normal direction of the radiation surface of the circularly polarized antenna.

6. The circularly polarized antenna device according to claim 2, wherein a normal line of the first surface of the dielectric substrate of the circularly polarized antenna and a normal line of a radiation surface of the circularly polarized antenna are parallel to each other, and wherein a radiating direction of the circularly polarized antenna is equal to a normal direction of the radiation surface of the circularly polarized antenna.

7. The circularly polarized antenna device according to claim 3, wherein a normal line of the first surface of the dielectric substrate of the circularly polarized antenna and a normal line of a radiation surface of the circularly polarized antenna are parallel to each other, and wherein a radiating direction of the circularly polarized antenna is equal to a normal direction of the radiation surface of the circularly polarized antenna.

8. The circularly polarized antenna device according to claim 4, wherein a normal line of the first surface of the dielectric substrate of the circularly polarized antenna and a normal line of a radiation surface of the circularly polarized antenna are parallel to each other, and wherein a radiating direction of the circularly polarized antenna is equal to a normal direction of the radiation surface of the circularly polarized antenna.

9. The circularly polarized antenna according to claim 2, wherein the antenna element has a predetermined polarization rotation direction, and is formed of a square-shaped spiral type or a circular spiral type having a central side end portion of a spiral, and wherein the circularly polarized antenna further comprises a feed pin whose one end side is connected to the central side end portion of the spiral of the antenna element, the feed pin penetrating the dielectric substrate and the ground conductor.

10. A wireless terminal measurement apparatus comprising:

a circularly polarized antenna device which is connectable to a wireless terminal measurement apparatus for performing measurements on a device under test (DUT) provided with an off-center antenna located towards one surface of the DUT, the circularly polarized antenna device comprising:

a circularly polarized antenna comprising a dielectric substrate and a circularly polarized type of antenna element formed on a first surface of the dielectric substrate, the first surface being opposite to the one surface of the DUT, the circularly polarized antenna being spatially coupled to the antenna of the DUT:

a holder for securing the circularly polarized antenna and the DUT wherein the antenna of the DUT and the first surface of the dielectric substrate are not parallel to each other;

a signal transmitter for outputting a test signal to the circularly polarized antenna and the DUT;

a signal receiver for receiving, through the circularly polarized antenna, a measurement signal output from the DUT in which the test signal was input; and an analyzer for analyzing the received measurement signal.

11. The wireless terminal measurement apparatus of claim 10 wherein the circularly polarized antenna device includes:

a ground conductor which is piled up at a second surface side of the dielectric substrate, the second surface being an opposite surface of the first surface of the dielectric substrate, a plurality of metal posts which are arranged at predetermined intervals so as to form a cavity, the metal posts surrounding the antenna element which is disposed in the cavity, wherein each of the metal posts has one and opposite ends, and penetrates the dielectric substrate along a thickness direction thereof, the one ends of the metal posts being connected to the ground conductor, and the opposite ends of the metal posts being arranged around the antenna element on the first surface of the dielectric substrate, and a frame-shaped conductor comprising a conducting rim which is disposed at the first surface side of the dielectric substrate and has a predetermined width in a direction of the antenna element, the conducting rim being extended along an arrangement of the opposite ends of the metal posts to define the cavity, and the conducting rim being connected to the opposite ends of the metal posts to short-circuit the metal posts, wherein the cavity and the frame-shaped conductor form a resonator, structural parameters of the resonator and the antenna element having been adjusted to set a resonant frequency of the resonator to a desired value, the structural parameters including at least one of an inside dimension $L_W$ of the given cavity, a rim width $L_R$ of the conducting rim, a number of turns of the antenna element, a basic length a0 of the antenna element, and an element width W of the antenna element, the rim width $L_R$ of the conducting rim being approximately ¼ of a wavelength of a surface wave propagating along the first surface of the dielectric substrate:

the wireless terminal measurement apparatus further comprising:
a signal transmitter for outputting a test signal to the circularly polarized antenna and the DUT;
a signal receiver for receiving, through the circularly polarized antenna, a measurement signal output from the DUT in which the test signal was input; and
an analyzer for analyzing the received measurement signal.

12. The wireless terminal measurement apparatus of claim 10 wherein:
a normal line of a radiation surface of the antenna of the DUT and a normal line of the one surface of the DUT are parallel to each other, and
wherein a radiating direction of the antenna of the DUT is equal to a normal direction of the radiation surface of the antenna of the DUT:
the wireless terminal appartus further comprising:
a signal transmitter for outputting a test signal to the circularly polarized antenna and the DUT;
a signal receiver for receiving, through the circularly polarized antenna, a measurement signal output from the DUT in which the test signal was input; and
an analyzer for analyzing the received measurement signal.

13. The wireless terminal measurement apparatus of claim 10 wherein a normal line of the first surface of the dielectric substrate of the circularly polarized antenna and a normal line of a radiation surface of the circularly polarized antenna are parallel to each other, and a radiating direction of the circularly polarized antenna is equal to a normal direction of the radiation surface of the circularly polarized antenna;
the wireless terminal measurement apparatus further comprising:
a signal transmitter for outputting a test signal to the circularly polarized antenna and the DUT;
a signal receiver for receiving, through the circularly polarized antenna, a measurement signal output from the DUT in which the test signal was input; and
an analyzer for analyzing the received measurement signal.

14. The wireless terminal measurement apparatus of claim 10 wherein the circularly polarized antenna device includes:
a ground conductor which is piled up at a second surface side of the dielectric substrate, the second surface being an opposite surface of the first surface of the dielectric substrate,
a plurality of metal posts which are arranged at predetermined intervals so as to form a cavity, the metal posts surrounding the antenna element which is disposed in the cavity, wherein each of the metal posts has one and opposite ends, and penetrates the dielectric substrate along a thickness direction thereof, the one ends of the metal posts being connected to the ground conductor, and the opposite ends of the metal posts being arranged around the antenna element on the first surface of the dielectric substrate, and
a frame-shaped conductor comprising a conducting rim which is disposed at the first surface side of the dielectric substrate and has a predetermined width in a direction of the antenna element, the conducting rim being extended along an arrangement of the opposite ends of the metal posts to define the cavity, and the conducting rim being connected to the opposite ends of the metal posts to short-circuit the metal posts,
wherein the cavity and the frame-shaped conductor form a resonator, structural parameters of the resonator and the antenna element having been adjusted to set a resonant frequency of the resonator to a desired value, the structural parameters including at least one of an inside dimension $L_W$ of the given cavity, a rim width $L_R$ of the conducting rim, a number of turns of the antenna element, a basic length a0 of the antenna element, and an element width W of the antenna element, the rim width $L_R$ of the conducting rim being approximately ¼ of a wavelength of a surface wave propagating along the first surface of the dielectric substrate:
wherein a normal line of the first surface of the dielectric substrate of the circularly polarized antenna and a normal line of a radiation surface of the circularly polarized antenna are parallel to each other, and a radiating direction of the circularly polarized antenna is equal to a normal direction of the radiation surface of the circularly polarized antenna;
the wireless terminal measurement apparatus further comprising:
a signal transmitter for outputting a test signal to the circularly polarized antenna and the DUT;
a signal receiver for receiving, through the circularly polarized antenna, a measurement signal output from the DUT in which the test signal was input; and
an analyzer for analyzing the received measurement signal.

15. The wireless terminal measurement apparatus of claim 10 wherein a normal line of a radiation surface of the antenna of the DUT and a normal line of the one surface of the DUT are parallel to each other, and wherein a radiating direction of the antenna of the DUT is equal to a normal direction of the radiation surface of the antenna of the DUT:
wherein a normal line of the first surface of the dielectric substrate of the circularly polarized antenna and a normal line of a radiation surface of the circularly polarized antenna are parallel to each other, and a radiating direction of the circularly polarized antenna is equal to a normal direction of the radiation surface of the circularly polarized antenna;
the wireless terminal measurement apparatus further comprising:
a signal transmitter for outputting a test signal to the circularly polarized antenna and the DUT;
a signal receiver for receiving, through the circularly polarized antenna, a measurement signal output from the DUT in which the test signal was input; and
an analyzer for analyzing the received measurement signal.

16. The wireless terminal measurement apparatus of claim 10 wherein the circularly polarized antenna device includes:
a ground conductor which is piled up at a second surface side of the dielectric substrate, the second surface being an opposite surface of the first surface of the dielectric substrate,
a plurality of metal posts which are arranged at predetermined intervals so as to form a cavity, the metal posts surrounding the antenna element which is disposed in the cavity, wherein each of the metal posts has one and opposite ends, and penetrates the dielectric substrate along a thickness direction thereof, the one ends of the metal posts being connected to the ground conductor, and the opposite ends of the metal posts being arranged around the antenna element on the first surface of the dielectric substrate, and a frame-shaped conductor comprising a conducting rim which is disposed at the first surface side of the dielectric substrate and has a predetermined width in a direction of the antenna element, the conducting rim being extended along an arrangement of the opposite ends of the metal posts to define the cavity, and the conducting rim being connected to the opposite ends of the metal posts to short-circuit the metal posts, wherein the cavity and the frame-shaped conductor form a resonator, structural parameters of the resonator and the antenna element having been adjusted to set a resonant frequency of the resonator to a desired value, the structural parameters including at least one of an inside dimension $L_W$ of the given cavity, a rim width $L_R$ of the conducting rim, a number of turns of the antenna element, a basic length a0 of the antenna element, and an element width W of the antenna element, the rim width $L_R$ of the conducting rim being approximately ¼ of a wavelength of a surface wave propagating along the first surface of the dielectric substrate:

wherein the antenna element has a predetermined polarization rotation direction, and is formed of a square-shaped spiral type or a circular sprial type having a central side end portion of a spiral, and the circularly polarized antenna further comprises a feed pin whose one end side is connected to the central side end portion of the spiral of the antenna;

the wireless terminal measurement apparatus further comprising:

a signal transmitter for outputting a test signal to the circularly polarized antenna and the DUT;

a signal receiver for receiving, through the circularly polarized antenna, a measurement signal output from the DUT in which the test signal was input; and an analyzer for analyzing the received measurement signal.

17. A wireless terminal measurement apparatus for performing measurements on a device under test (DUT) provided with an off-center antenna located towards one surface of the DUT, the wireless terminal measurement apparatus comprising:

a circularly polarized antenna comprising a dielectric substrate and a circularly polarized type of antenna element formed on a first surface of the dielectric substrate, the first surface being opposite to the one surface of the DUT, the circularly polarized antenna being spatially coupled to the antenna of the DUT;

a signal transmitter for outputting a test signal to the circularly polarized antenna and the DUT;

a signal receiver for receiving, through the circularly polarized antenna, a measurement signal output from the DUT in which the test signal was input;

an analyzer for analyzing the received measurement signal;

a conveyor for conveying the DUT in a conveying path;

a measurement box in which the circularly polarized antenna is disposed, the measurement box having an entrance and an exit for conveyance of the DUT; and a determination unit for determining whether or not the entire DUT has been conveyed to a predetermined area in the measurement box, wherein when the determination unit determines that the entire DUT has been conveyed to the predetermined area, the signal transmitter outputs the test signal to the circularly polarized antenna and the DUT conveyed by the conveyor, wherein when the determination unit determines that the entire DUT has been conveyed to the predetermined area, the signal receiver receives the measurement signal output from the DUT in which the test signal was input, and wherein the antenna of the DUT and the first surface of the dielectric substrate of the circularly polarized antenna are not parallel to each other.

18. The wireless terminal measurement apparatus according to claim 17, further comprising an electromagnetic wave absorber provided above the conveying path, the absorber preventing electromagnetic waves generated by the antenna of the DUT and the circularly polarized antenna from leaking out from the entrance and the exit of the measurement box, wherein the measurement box has an electromagnetic wave shielding function.

19. The wireless terminal measurement apparatus according to claim 17, wherein the circularly polarized antenna comprises a ground conductor which is piled up at a second surface side of the dielectric substrate, the second surface being an opposite surface of the first surface of the dielectric substrate, a plurality of metal posts which are arranged at predetermined intervals so as to form a cavity, the metal posts surrounding the antenna element which is disposed in the cavity, wherein each of the metal posts has one and opposite ends, and penetrates the dielectric substrate along a thickness direction thereof, the one ends of the metal posts being connected to the ground conductor, and the opposite ends of the metal posts being arranged around the antenna element on the first surface of the dielectric substrate, and a frame-shaped conductor comprising a conducting rim which is disposed at the first surface side of the dielectric substrate and has a predetermined width in a direction of the antenna element, the conducting rim being extended along an arrangement of the opposite ends of the metal posts to define the cavity, and the conducting rim being connected to the opposite ends of the metal posts to short-circuit the metal posts, wherein the cavity and the frame-shaped conductor form a resonator, structural parameters of the resonator and the antenna element having been adjusted to set a resonant frequency of the resonator to a desired value, the structural parameters including at least one of an inside dimension $L_W$ of the given cavity, a rim width $L_R$ of the conducting rim, a number of turns of the antenna element, a basic length a0 of the antenna element, and an element width W of the antenna element, the rim width $L_R$ of the conducting rim being approximately ¼ of a wavelength of a surface wave propagating along the first surface of the dielectric substrate.

* * * * *